United States Patent
Simons et al.

(10) Patent No.: US 10,504,267 B2
(45) Date of Patent: Dec. 10, 2019

(54) GENERATING A STYLIZED IMAGE OR STYLIZED ANIMATION BY MATCHING SEMANTIC FEATURES VIA AN APPEARANCE GUIDE, A SEGMENTATION GUIDE, AND/OR A TEMPORAL GUIDE

(71) Applicant: Adobe Inc., San Jose, CA (US)

(72) Inventors: David Simons, Seattle, WA (US); Michal Lukac, San Jose, CA (US); Daniel Sykora, Prague (CZ); Elya Shechtman, Seattle, WA (US); Paul Asente, Redwood City, CA (US); Jingwan Lu, San Jose, CA (US); Jakub Fiser, Prague (CZ); Ondrej Jamriska, Prague (CZ)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/784,415

(22) Filed: Oct. 16, 2017

(65) Prior Publication Data
US 2018/0350030 A1    Dec. 6, 2018

Related U.S. Application Data

(60) Provisional application No. 62/515,994, filed on Jun. 6, 2017.

(51) Int. Cl.
*G06T 13/40* (2011.01)
*G06K 9/00* (2006.01)
(Continued)

(52) U.S. Cl.
CPC .......... *G06T 13/40* (2013.01); *G06K 9/00228* (2013.01); *G06K 9/00281* (2013.01);
(Continued)

(58) Field of Classification Search
CPC .......... G06T 13/40; G06T 7/155; G06T 7/90; G06T 3/0068; G06T 3/0093;
(Continued)

(56) References Cited

U.S. PATENT DOCUMENTS 9,799,096 B1 * 10/2017 De la Torre .......... G06T 3/0093
9,996,981 B1 *  6/2018 Tran ...................... G06T 19/006
(Continued)

OTHER PUBLICATIONS

Rematas, Konstantlinos, et al., "Novel View of Objects From a Single Image", arXiv:1602.00328v2, Aug. 15, 2016, 14 pages.
(Continued)

*Primary Examiner* — Antonio A Caschera
(74) *Attorney, Agent, or Firm* — Kilpatrick Townsend & Stockton LLP

(57) ABSTRACT

Certain embodiments involve generating an appearance guide, a segmentation guide, and a positional guide and using one or more of the guides to synthesize a stylized image or animation. For example, a system obtains data indicating a target and a style exemplar image and generates a segmentation guide for segmenting the target image and the style exemplar image and identifying a feature of the target image and a corresponding feature of the style exemplar image. The system generates a positional guide for determining positions of the target feature and style feature relative to a common grid system. The system generates an appearance guide for modifying intensity levels and contrast values in the target image based on the style exemplar image. The system uses one or more of the guides to transfer a texture of the style feature to the corresponding target feature.

20 Claims, 14 Drawing Sheets

(51) Int. Cl.

| | | |
|---|---|---|
| *G06T 7/194* | (2017.01) | |
| *G06T 7/11* | (2017.01) | |
| *G06T 7/73* | (2017.01) | |
| *G06T 7/90* | (2017.01) | |
| *G06T 3/00* | (2006.01) | |
| *G06T 5/00* | (2006.01) | |
| *G06T 5/50* | (2006.01) | |
| *G06T 11/00* | (2006.01) | |
| *G06T 13/80* | (2011.01) | |
| *G06T 15/04* | (2011.01) | |
| *G06T 7/60* | (2017.01) | |
| *G06T 15/02* | (2011.01) | |

(52) U.S. Cl.
CPC ........ *G06K 9/00315* (2013.01); *G06T 3/0068* (2013.01); *G06T 3/0093* (2013.01); *G06T 5/002* (2013.01); *G06T 5/50* (2013.01); *G06T 7/11* (2017.01); *G06T 7/194* (2017.01); *G06T 7/73* (2017.01); *G06T 7/90* (2017.01); *G06T 11/001* (2013.01); *G06T 13/80* (2013.01); *G06T 15/04* (2013.01); *G06T 7/60* (2013.01); *G06T 15/02* (2013.01); *G06T 2207/10016* (2013.01); *G06T 2207/20076* (2013.01); *G06T 2207/20221* (2013.01); *G06T 2207/30201* (2013.01)

(58) Field of Classification Search
CPC ................... G06T 11/001; G06T 13/80; G06T 2207/20221; G06T 2207/30201
See application file for complete search history.

(56) References Cited

U.S. PATENT DOCUMENTS

| | | | | |
|---|---|---|---|---|
| 2013/0129226 | A1* | 5/2013 | Abe | G06K 9/46 382/199 |
| 2018/0061009 | A1* | 3/2018 | Gren | G06T 5/002 |

OTHER PUBLICATIONS

Shih, Yichang, et al., "Style Transfer for Headshot Portraits", Association for Computing Machinery, Proceedings of ACM Siggraph 2014, vol. 33, Issue 4, Article 148, Jul. 2014, 14 pages.
Liu Sifei, et al., "Multi-Objective Convolutional Learning for Face Labeling", IEEEConfernce on Computer Vision and Pattern Recognition, Jun. 2015, 9 pages.
Fiser, Jakub, et al., "Color Me Noisy: Example-Based Rendering of Hand-Colored Animations with Temporal Noise Control", Computer Graphics Forum, vol. 33, Issue 4, Jul. 2014, 10 pages.
Bénard, Pierre., "Stylizing Animation by Example". ACM Transactions on Graphics, vol. 32, Issue 4, Article 119, Jul. 2013, 12 pages.
Chen, Hong, et al., "Example-Based Automatic Portraiture," In Proceedings of Asian Conference on Computer Vision, Jan. 2002, 6 pages.
Chen, Hong, et al., "PicToon: A Personalized Image-Based Cartoon System," In Proceedings of ACM International Conference on Multimedia, Dec. 2002, 8 pages.
Chen, Hong, et al, "Example-Based Composite Sketching of Human Portraits," In Proceedings of International Symposium on Non-Photorealistic Animation and Rendering, Jun. 2004, 8 pages.
Decarlo, Decarlo, et al., "Stylization and Abstraction of Photographs," ACM Transactions on Graphics vol. 21, Issue 3, Jul. 2002, 8 pages.
Dipaola, Steve, "Painterly Rendered Portraits From Photographs Using a Knowledge-Based Approach," In Proceedings of SPIE Human Vision and Electronic Imaging, vol. 6492, 2007, 10 pages.
Efros, Alexei. A., et al., "Image Quilting for Texture Synthesis and Transfer," In SIGGRAPH Conference Proceedings, 2001, 6 pages.
Fiser, Jakub., et al., "Color Me Noisy: Example-Based Rendering of Hand-Colored Animations With Temporal Noise Control," Computer Graphics Forum 33, 4, 2014, 10 pages.
Fiser, Jakub., et al., "Stylit: Illumination-Guided Example-Based Stylization of 3D Renderings," ACM Transactions on Graphics, vol. 35, Issue 4, Article 92, Jul. 2016, 11 pages.
Gatys, Leon A., et al, "Image Style Transfer Using Convolutional Neural Networks," In Proceedings of the IEEE Conference on Computer Vision and Pattern Recognition, 2016, 10 pages.
Gooch, Bruce, et al., "Human Facial Illustrations: Creation and Psychophysical Evaluation," ACM Transactions on Graphics, vol. 23, Issue 1, Jan. 2004, 13 pages.
Hays, James, et al., "Image and Video Based Painterly Animation," In Proceedings of International Symposium on Non-Photorealistic Animation and Rendering, Jun. 2004, 8 pages.
Hertzmann, Aaron, et al., "Image Analogies," In Siggraph Conference Proceedings, 2001, 14 pages.
Jamrisk Ondrej, et al., "LazyFluids: Appearance Transfer for Fluid Animations," ACM Transactions on Graphics, vol. 34, Issue 4, Article 92, Aug. 2015, 10 pages.
Kazemi, Vahid, et al., "One Millisecond Face Alignment With an Ensemble of Regression Trees," In Proceedings of IEEE Conference on Computer Vision and Pattern Recognition, 2014, 8 pages.
Kwatra, Vivek, et al., "Texture Optimization for Example-Based Synthesis," ACM Transactions on Graphics, vol. 24, Issue 3, 2005, 8 pages.
Kyprianidis, Jane Eric, et al., "State of the 'Art': A Taxonomy of Artistic Stylization Techniques for Images and Video," IEEE Transactions on Visualization and Computer Graphics 19, 5, 2012, 20 pages.
Levin, Anat, et al., "A Closed-Form Solution to Natural Image Matting," IEEE Transactions on Pattern Analysis and Machine Intelligence, 30, 2, 2008, 8 pages.
Li, Hongliang, et al., "Guided face cartoon synthesis," IEEE Transactions on Multimedia, vol. 13, 6, Dec. 2011, 1 page.
Liu, Ce, et al., "Sift Flow: Dense Correspondence Across Scenes and Its Applications," IEEE Transactions on Pattern Analysis and Machine Intelligence, vol. 33, 5, 2011, 17 pages.
Meng, Meng, et al., "Artistic Paper-Cut of Human Portraits," In Proceedings of ACM Multimedia, 2010, 4 pages.
Schaefer, Scott, et al., "Image Deformation Using Moving Least Squares," ACM Transactions on Graphics 25, 3, 2006, 8 pages.
Shen, X., et al., "Automatic Portrait Segmentation for Image Stylization," Computer Graphics Forum 35, 2, 2016, 10 pages.
Shih, Y.-C., et al, "Style transfer for headshot portraits," ACM Transactions on Graphics 33, 4, 148, 2014, 14 pages.
Simonyan, K., et al., "Very Deep Convolutional Networks for Large-Scale Image Recognition," CoRR abs/1409.1556, 2015, 14 pages.
Sinha, P., et al., "Face Recognition by Humans. Nineteen Results All Computer Vision Researchers Should Know About," Proceedings of the IEEE 94, 11, Nov. 2006, 15 pages.
Tresset, P., et al., "Generative portrait sketching," In Proceedings of International Conference on Virtual Systems and Multimedia, 2005, 10 pages.
Wang, X., et al., "Face Photo-Sketch Synthesis and Recognition," IEEE Transactions on Pattern Analysis and Machine Intelligence 31, 11, Nov. 2009, 13 pages.
Wang, Nannan, et al., "Transductive Face Sketch-Photo Synthesis," IEEE Transactions on Neural Networks and Learning Systems 24, 9, 1, Sep. 2013, 13 pages.
Wang, et al., "Learnable Stroke Models for Example-Based Portrait Painting," In Proceedings of British Machine Vision Conference, 2013 11 pages.
Wexler, Y., et al., "Space-Time Completion of Video," IEEE Transactions on Pattern Analysis and Machine Intelligence 29, 3, Mar. 2007, 14 pages.
Winnemoller, Holger, et al. "Real-Time Video Abstraction," ACM Transactions on Graphics 25, 3, 2006, 6 pages.
Yang, M., et al., "Semantics-Driven Portrait Cartoon Stylization," In Proceedings of International Conference on Image Processing, Sep. 2010, 4 pages.

(56) References Cited

OTHER PUBLICATIONS

Yang, Y., et al., "Semantic Portrait Color Transfer With Internet Images," Multimedia Tools and Applications, 2017, 19 pages.
Zeng, K., et al., "From Image Parsing to Painterly Rendering," ACM Transactions on Graphics 29, 1, 2, 2009, 17 pages.
Zhang, Y.,, et al., "Data-Driven Face Cartoon Stylization," In SIG-GRAPH Asia Technical Briefs, 14, 2014, 4 pages.
Zhao, M., et al., "Portrait Painting Using Active Templates," In Proceedings of International Symposium on Non-Photorealistic Animation and Rendering, 2011, 7 pages.
Zhou, H., et al., "Markov Weight Fields for Face Sketch Synthesis," In Proceedings of IEEE Conference on Computer Vision and Pattern Recognition, 2012, 7 pages.
Berger, Itamar, et al., "Style and Abstraction in Portrait Sketching" ACM Transactions on Graphics, vol. 32, Issue 4, Article No. 55, 63 pages, May 2013.
Gong, Yihong, et al., "Detection of Regions Matching Specified Chromatic Features," Computer Vision and Image Understanding, vol. 61, No. 2, 7 pages, Mar. 1995.
Grady, Leo, "Random walks for image segmentation," IEEE Transactions on Pattern Analysis and Machine Intelligence, vol. 28, No. 11, 17 pages, Nov. 2006.
Kemelmacher-Shlizerman, Ira, "Transfiguring portraits" ACM Transactions on Graphics 35, 4, 942016, 8 pages, Jul. 2016.
Newson, Alasdair, et al., "Video Inpainting of Complex Scenes," SIAM Journal of Imaging Science 7, 4, 27 pages, 2010.
Noris, G., , et al. "Temporal Noise Control for Sketchy Animation," In Proceedings of International Symposium on Non-photorealistic Animation and Rendering, 6 pages, 2014.
Orzan, Alexandrina, et al., "Diffusion Curves: A Vector Representation for Smooth-Shaded Images," ACM Transactions on Graphics, vol. 27, Issue 3, 9, 8 pages, 2011.
Portilla, Javier, et al., "A Parametric Texture Model Based on Joint Statistics of Complex Wavelet Coefficients," International Journal of Computer Vision 40, 1, 23 pages, 2008.
Ruder, Manuel, et al., "Artistic Style Transfer for Videos," In Proceedings of German Conference Pattern Recognition, 21 pages, 2000.
Selim, Amed, et al., "Painting Style Transfer for Head Portraits Using Convolutional Neural Networks," ACM Transactions on Graphics 35, 4, 129, 18 pages, Jul. 2016.
Wang, Nannan, et al., "A Comprehensive Survey to Face Hallucination" International Journal of Computer Vision 106, 1, 24 pages, 2013.

\* cited by examiner

GENERATING A STYLIZED IMAGE OR STYLIZED ANIMATION BY MATCHING SEMANTIC FEATURES VIA AN APPEARANCE GUIDE, A SEGMENTATION GUIDE, AND/OR A TEMPORAL GUIDE

CROSS-REFERENCE TO RELATED APPLICATIONS

This disclosure claims priority to U.S. Provisional Application No. 62/515,994, titled "Generating a Stylized Layered Image or Stylized Animation by Matching Semantic Features Via an Appearance Guide, a Segmentation Guide, and a Positional Guide" and filed Jun. 6, 2017, the entirety of which is hereby incorporated by reference herein.

TECHNICAL FIELD

This disclosure generally relates to computer animation or computer graphics and more specifically relates to generating or synthesizing stylized images or animations by generating an appearance guide, a segmentation guide, or a positional guide and using one or more of the guides to identify priority features (e.g., semantic features) from both a target image and a style exemplar image and match the priority features from the target image to priority features of the style exemplar image.

BACKGROUND

Computer animation methods and techniques can involve using computer graphics systems to generate one or more animated images, characters, or objects. In some instances, the computer graphics system receives a target image and generates an animated image, character, or object. To do so, the computer graphics system creates a stylized image that mimics an artistic style or texture and looks like the target image. The stylized image is used as an animated image or character. For example, the computer graphics system may receive, as a target image, a photograph of a person used as the basis for an animated character. The computer graphics system also receives a style exemplar image (sometimes called a "template image") that has a desired artistic style or texture to be applied to the target image, such as a watercolor drawing. The computer graphic system renders a rendition of the target image by applying the watercolor style or texture from the style exemplar image to the target image to create a stylized image that includes the person from the target image depicted as a watercolor drawing rather than a photograph.

Some existing computer graphics systems may not retain local textural details of the style exemplar image when applying the style or texture of the style exemplar image to the target image. For example, these solutions may not distinguish semantic features of the target image, such as a subject's face, from less meaningful features, such as objects in the background of the target image. This failure to focus on semantic features of the target image causes the stylized image to have an undesirable appearance (e.g., significant differences between the style or texture of the stylized image and the style exemplar image used to generate the stylized image). Furthermore, some existing methods of generating or synthesizing stylized images may require perfect alignment (e.g., warping) of the target image with the style exemplar image, which can cause the computer graphics system to warp or distort the target image when transferring the texture or style of the style exemplar image to the target image and generate a warped stylized image (e.g., a stylized image having an elongated or smeared appearance).

SUMMARY

Various embodiments of the present disclosure provide systems and methods for generating or synthesizing a stylized image or stylized animation.

In one example, a method for generating a stylized image includes obtaining, by a processor, data indicating a target image and a style exemplar image. The target image includes a first character and the style exemplar image includes a second character. The style exemplar image includes a style or texture. The method further includes generating, by the processor, a segmentation guide for the target image and the style exemplar image. Generating the segmentation guide for the target image and the style exemplar image includes: creating a first head soft mask of the first character and a second head soft mask of the second character; identifying a plurality of target features of the target image and a plurality of style features of the style exemplar image; and creating a soft mask for a target feature of the plurality of target features and a soft mask for a style feature of the plurality of style features. The method further includes creating, by the processor, a stylized image using the segmentation guide. Creating the stylized image using the segmentation guide includes applying, by the processor and using the segmentation guide, the texture or style from the style exemplar image to the target image. The method further includes outputting, by the processor, the stylized image for display via a user interface or for storage.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
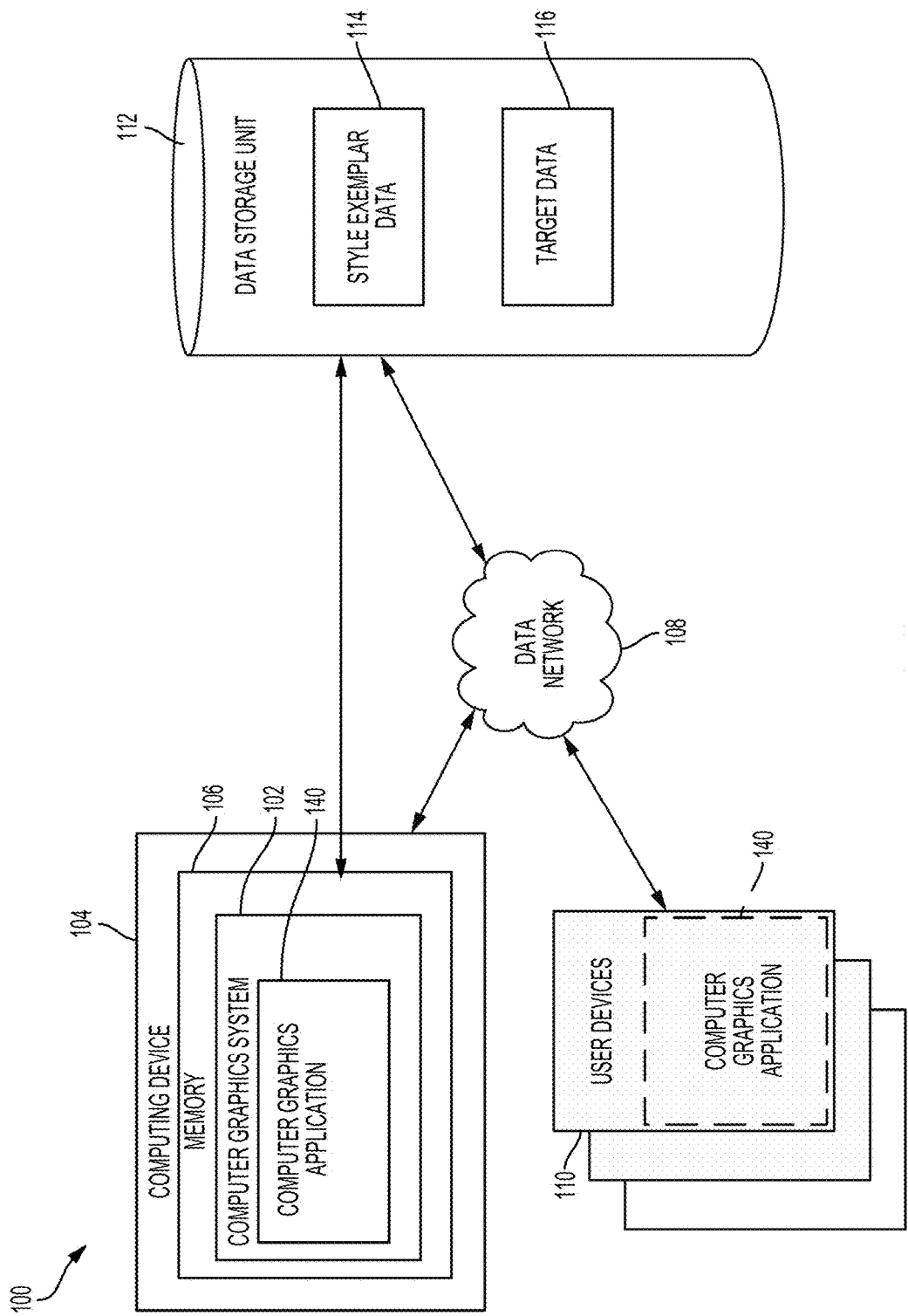
FIG. 1 is a block diagram of an exemplary environment in which a computer graphics system generates a stylized image or animation in accordance with one or more embodiments.

Various embodiments of the present disclosure involve generating or synthesizing stylized images (e.g., frames) or animations (e.g., videos) by generating an appearance guide, a segmentation guide, and a positional guide and using one or more of the guides to identify priority features (e.g., semantic features) of a target image and priority features of a style exemplar image and match the priority features from the target image to corresponding priority features of the style exemplar images and apply a texture or style of the features of the style exemplar image to corresponding features of the target image. For example, a computer graphics device receives, via user input, a target image or frame (e.g., a photograph) and a style exemplar image with a particular artistic style or texture (e.g., a watercolor drawing) to be applied to the target image. The computer graphics device generates the stylized image by generating a segmentation guide for both the target image and the style exemplar image for identifying a high-priority target feature of the target image (e.g., a semantic feature of the target image) and identifying a corresponding style feature of the style exemplar image. The computer graphics device generates a positional guide for both the target image and the style exemplar image for determining the positions of the identified target feature and style feature relative to a common grid system, which allows matching the target feature to the style feature without aligning the target image and the style exemplar image. The computer graphics device can also generate an appearance guide for both the target image and the style exemplar image such that the intensity levels and contrast values in the appearance guide for the target image match the intensity levels and contrast values in the appearance guide of the style exemplar image, which can preserve an identity of a subject in the target image while retaining a textural richness of the style exemplar image. The computer graphics device uses one or more of the generated guides to transfer a texture of a style feature to a corresponding target feature, thereby generating a stylized image using semantic features of the target image and style exemplar image.

The following example is provided to introduce certain embodiments. In this example, a target image is a photograph of a first person's head and a style exemplar image is an image of a second person's head, where the style exemplar image has a particular artistic style or one or more textures. The computer graphics device generates a segmentation guide for both the target image and the style exemplar image that that can be used to identify a semantic feature of the first person's head such as, for example, the first person's nose and identify a corresponding semantic feature of the second person's head such as the second's person's nose. In some examples, the computer graphics device generates the segmentation guide for both the style exemplar image and the target image by creating a mask or soft mask of one or more features of the target image and the style exemplar image. In some examples, creating a mask can involve applying a mask to a layer of the target image and the style exemplar image that includes a particular feature of the target image and style exemplar image and controlling a transparency of the mask. In some examples, controlling the transparency of the mask can create, indicate, or reveal a boundary or portion (e.g., a visible boundary or portion) of the feature or layer of the image. In some instances, creating a soft mask can involve creating or blending one or more boundaries of one or more features or layers of an image. For example, the computer graphics system can create a head soft mask of the first person in the target image (e.g., a soft mask of the first person's head) and a head soft mask of the second person in the style exemplar image. As another example, the computer graphics system creates a hair region soft mask of the first person in the target image and a hair region soft mask of the second person in the style exemplar image. In some instances, the computer graphics system creates a mask or soft mask of one or more features of the first person in the target image and the second person in the style exemplar image using a diffusion curve, which can be used to blur or determine a boundary of the one or more features.

The computer graphics device also generates a positional guide for both the target image and the style exemplar image, which is used to associate the two noses during a stylization process, by determining positions of the first person's nose and a position of the second person's nose. The positions are determined relative to a grid or coordinate system for the target and style exemplar image (e.g., a common grid or common coordinate system for the target and style exemplar image). The computer graphics devices creates the stylized image by generating a mapping between the positions of the first and second noses, which allows a stylization process to apply a texture or style of the "style" nose (i.e., the second nose in the style exemplar image) to the "target" nose (i.e., the first nose in the target image). The computer graphics device generates an appearance guide for both target and style exemplar images such that the intensity levels and the contrast in the appearance guide for the target image match the intensity levels and the contrast in the appearance guide of the style exemplar image (e.g., an intensity level or the contrast near the first person's nose corresponds to an intensity level or contrast near the second person's nose), which can preserve an identity of the first person in the target image while retaining a textural richness of the style exemplar image. The computer graphics device can output the stylized image via a user interface or for storage.

Thus, in some embodiments, the computer graphics device uses one or more of the appearance guide, segmentation guide, and a positional guide to generate a stylized image that preserves the identity of the first person in the target image and retains local textural richness of the style exemplar image. In certain embodiments, using the appearance guide, segmentation guide, and/or positional guide to generate the stylized image obviates the need to perfectly align (e.g., warp) the target image with the style exemplar image, since a mapping between the target feature and the style feature via the positional guide allows the computer graphics device to match the target and style features during the stylization process. Performing the stylization without requiring perfect alignment between the target image and style exemplar images allows the computer graphics device to generate a stylized image that does not include warped or distorted features.

In some embodiments, the computer graphics device extends the functions described above by generating a stylized animation or video that includes one or more stylized images. For example, the computer graphics device generates a temporal guide that can be used to determine or control an amount an amount of temporal flickering for the stylized animation. Temporal flickering includes, for example, generating a flickering or blinking effect or appearance between consecutive images or frames of the stylized animation. The computer graphics device uses the temporal guide to create the stylized animation such that an appearance of a sequence of stylized images of a particular style is preserved while exhibiting a certain amount of temporal flickering. The computer graphics device generates a temporal guide that identifies a desired amount of temporal flickering for a stylized animation by, for example, generating blurred versions of the style exemplar image used to create the stylized animation and the amount of blur in the images controls the temporal flickering for the stylized animation. Thus, in some embodiments, the computer graphics device can create a stylized video with less than full temporal coherence.

As used herein, the term "animation" is used to refer to any sequence or stream of images or frames or a video that includes various images or frames.

As used herein, the term "style exemplar" is used to refer to any image or animation having one or more styles (e.g., has an appearance according to an artistic style) or textures that can be applied to another image or animation.

As used herein, the term "target image" or "target frame" is used to refer to any image or frame to which one or more styles or textures can be applied.

As used herein, the term "stylized animation" or "stylized video" is used to refer to any stream or sequence of stylized images or frames.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a computer graphics system 102 generates a stylized image or animation, according to certain embodiments. The environment 100 includes the computer graphics system 102, one or more computing devices 104, and one or more data storage units 112. The computer graphics system 102, the computing devices 104, and the data storage unit 112 are communicatively coupled via one or more data networks 108 (e.g., the Internet, one or more local area networks ("LAN"), one or more wired area networks, or some combination thereof).

In some embodiments, a user of the computing device 104 visits a webpage or an application store to explore applications supported by the computer graphics system 102. The computer graphics system 102 provides the applications as a software as service, or as a standalone application that may be installed on the computing device 104, or as a combination.

The data storage unit 112 stores various style exemplar images or animations as style exemplar data 114 and stores various target images or animations as target data 116. A style exemplar image or animation can be any image or animation having one or more styles (e.g., has an appearance according to an artistic style) or including a texture that can be applied to another image or animation. For example, a style exemplar image is a watercolor drawing, an impressionism-based drawing, an oil painting, an abstract drawing, or a pen and ink drawing. In some embodiments, a target image or animation includes any image or animation to which one or more styles or textures of a style exemplar image or animation can be applied. In some examples, the data storage unit 112 receives or obtains a style exemplar image or animation or a target image or animation from one or more other user devices 110, a server, user input (e.g., if a user programs the data storage unit 112 to include a style exemplar animation or target animation or provides user input indicating a style exemplar animation or target animation), or any other source.

In some embodiments, the computing device 104 is communicatively coupled to the data storage unit 112 and the computing device 104 receives or obtains style exemplar data 114 or target data 116 from the data storage unit 112 via the data network 108 or a direct connection. In another embodiment, the computing device 104 includes the data storage unit 112 and can access the style exemplar data 114 or target data 116.

In some embodiments, the computing device 104 represents various types of client devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In this example, the computer graphics system 102 is implemented on, executed by, or stored on one or more computing devices 104. For example, the computer graphics system 102 is stored on a memory device 106 of the computing device 104. In some embodiments, the computer graphics system 102 is executed on the one or more computing devices 104 via a computer graphics application 140.

In some embodiments, the user devices 110 can be any type of client device and may include a computer graphics application 140. In this example, one or more components of the computer graphics system 102 may be stored on, implemented on, or executed by the user devices 110.

In some embodiments, the computer graphics system 102 includes the computer graphics application 140, which can include one or more instructions stored on a computer-readable storage medium and executable by processors of the computing device 104. When executed by the one or more processors, the computer-executable instructions of the computer graphics application 140 cause the computer graphics system 102 to generate or synthesize a stylized animation based on a style exemplar animation and a target animation.

For example, the computer graphics system 102 obtains or receives a target image and a style exemplar image from the data storage unit 112 (e.g., from style exemplar data 114 or target data 116 stored on data storage unit 112). The target image includes an image of a first person's head (e.g., a headshot of the person's head) and the style exemplar image includes an image of a second person's head. In this example, the style exemplar image has one or more styles or includes one or more textures. In some embodiments, the first person in the target image and the second person in the style exemplar image can be the same person or different people.

In some embodiments, the computer graphics application 140 causes the computer graphics system 102 to generate a segmentation guide by subdividing both the target image and the style exemplar image into various regions or features. The various regions or features can include one or more high-priority regions or features of the target image and the style exemplar image. Examples of a high-priority region include semantic regions or features of the target image and semantic regions or features of the style exemplar image. An example of a semantic feature can include, but is not limited to, the hair, eyebrow, nose, lip, oral cavity, eye, skin, chin, etc. of the first or second person's head in the target image and style exemplar image. Since these features are more critical to conveying the semantic meaning of an image's subject (i.e., depicting distinguishing features of a person's face), these features are assigned a higher priority than other features that are less useful for conveying the semantic meaning of an image's subject (e.g., less distinctive features, such as a person's forehead). In some embodiments, the computer graphics application 140 identifies or detects one or more of the regions or features of the style exemplar image and target image using the segmentation guide.

The computer graphics application 140 causes the computer graphics system 102 to generate a positional guide for both the target image and the style exemplar image. The positional guide can be generated by determining positional data about the style exemplar image and the target image. For example, the computer graphics system 102 generates a positional guide by determining a position of the various identified features or regions of the first and second person's head relative to a grid or coordinate system (e.g., a common grid or coordinate system). In some embodiments, the computer graphic system 102 uses the positional guide to apply a style or texture at a particular location or position in the style exemplar image to a similar location or position in the target image. As an example, the computer graphics system 102 uses the positional guide to identify or determine a texture at a location on the second person's head in the style exemplar image, identify a corresponding or similar location on the first person's head in the target image, and apply the texture from the location on the second person's head in the style exemplar image to the corresponding location or position on the first person's head in the target image.

In some embodiments, the computer graphics application 140 causes the computer graphics system 102 to generate an appearance guide by modifying the target image based on the style exemplar image. For example, the computer graphics system 102 generates an appearance guide for the target image and the style exemplar image, which is used to identify an intensity level or contrast in the target image (e.g., an intensity level or contrast at a location on the first person's head in the target image) and an intensity level or contrast in the style exemplar image (e.g., an intensity level or contrast at a corresponding or similar location on the second person's head in the style exemplar image). The computer graphics application 140 causes the computer graphics system 102 to use the appearance guide to adjust the intensity level and/or contrast in the target image such that the intensity levels and contrast values in the appearance guide for the target image match the intensity levels and contrast values in the appearance guide of the style exemplar image, e.g., such that the intensity level or contrast level at a location on the first person's head in the target image corresponds to the intensity level or contrast value at a corresponding or similar location on the second person's head in the style exemplar image. In this example, adjusting the intensity level or contrast value in the target image can preserve the identity of the first person in the target image while retaining a textural richness of the style exemplar image.

In some examples, the computer graphics application 140 causes the computer graphics system 102 to use one or more algorithms to generate the appearance guide. The computer graphics system 102 generates an appearance guide for the target image and an appearance guide for the style exemplar image such that various intensity levels or contrast values in the appearance guide for the target image match corresponding intensity levels or contrast values in the appearance guide for the style exemplar image. An example of an algorithm that can be used by the computer graphics system 102 to modify an intensity level or contrast value in the target image based on an intensity level or contrast value in the style exemplar image is described in Y. Shih et al., "Style Transfer for Headshot Portraits," Volume 33, Issue 4 ACM TRANSACTIONS ON GRAPHICS (TOG)—PROCEEDINGS OF ACM SIGGRAPH, Article No. 148 (July 2014), available at http://people.csail.mit.edu/billf/publications/SIGGRAPH2014_portrait.pdf, which is incorporated by reference herein. In some embodiments, the computer graphics system 102 can add one or more weighting channels or values to one or more pixels in the target image to boost the effect of the algorithm used to generate the appearance guide for the target image and the style exemplar image at the one or more pixels, which can balance preserving the identity of the person in the target image and retaining the textural richness of the style exemplar image.

The computer graphics system 102 generates one or more stylized animations using one or more of the segmentation guide, the positional guide, and the appearance guide and outputs the generated stylized animation in which a style or texture of the style exemplar image has been applied to the target image. For example, the computer graphics system 102 uses the segmentation guide, the positional guide, and the appearance guide to apply a style or texture of the style exemplar image to the target image. In some embodiments, the computer graphics system 102 generates a stylized image or animation by using the segmentation guide, the positional guide, and the appearance guide to perform non-parametric texture synthesis.

In this manner, the computer graphics system 102 uses various algorithms to generate stylized animations that preserve the identity of an object or character in the target image (e.g., preserves the identity of the first person in the target image) and the visual richness of the style exemplar image (e.g., by retaining the local textural details of the style exemplar image). In some embodiments, the computer graphics system 102 can apply a texture or style from a style exemplar image to a target image to generate a stylized animation that does not include warped or distorted features.

In certain embodiments, the computer graphics application 140 causes the computer graphics system 102 to generate a stylized video or a stylized animation. In this example, the computer graphics system 102 can generate a temporal guide to generate a stylized video that preserves an appearance of a sequence of images having a particular style or texture and can exhibit a certain amount of temporal flickering. In some embodiments, the computer graphics system 102 determines an amount of temporal flickering for the stylized video and controls the temporal flickering in the stylized video based on the determined amount. As an example, the computer graphics system 102 determines an amount of temporal flickering for a stylized video such that the stylized video preserves an appearance of a sequence of hand-drawn images and exhibits a certain amount of temporal flickering and the computer graphics system 102 creates the stylized video based on the determined amount of temporal flickering. Thus, in certain examples, the computer graphics system 102 can be used to create stylized videos with less than full temporal coherence by allowing a controllable amount of temporal flickering.

Although the exemplary environment 100 of FIG. 1 is depicted as having a certain number of components, in other embodiments, the exemplary environment 100 has any number of additional or alternative components. Further, while FIG. 1 illustrates a particular arrangement of the computer graphics system 102, user devices 110, and the data storage unit 112, various additional arrangements are possible. As an example, while FIG. 1 illustrates data storage unit 112 and the computer graphics system 102 as part of separate systems, in some embodiments, the data storage unit 112 and the computer graphics system 102 are part of a single system.

Figure 2:
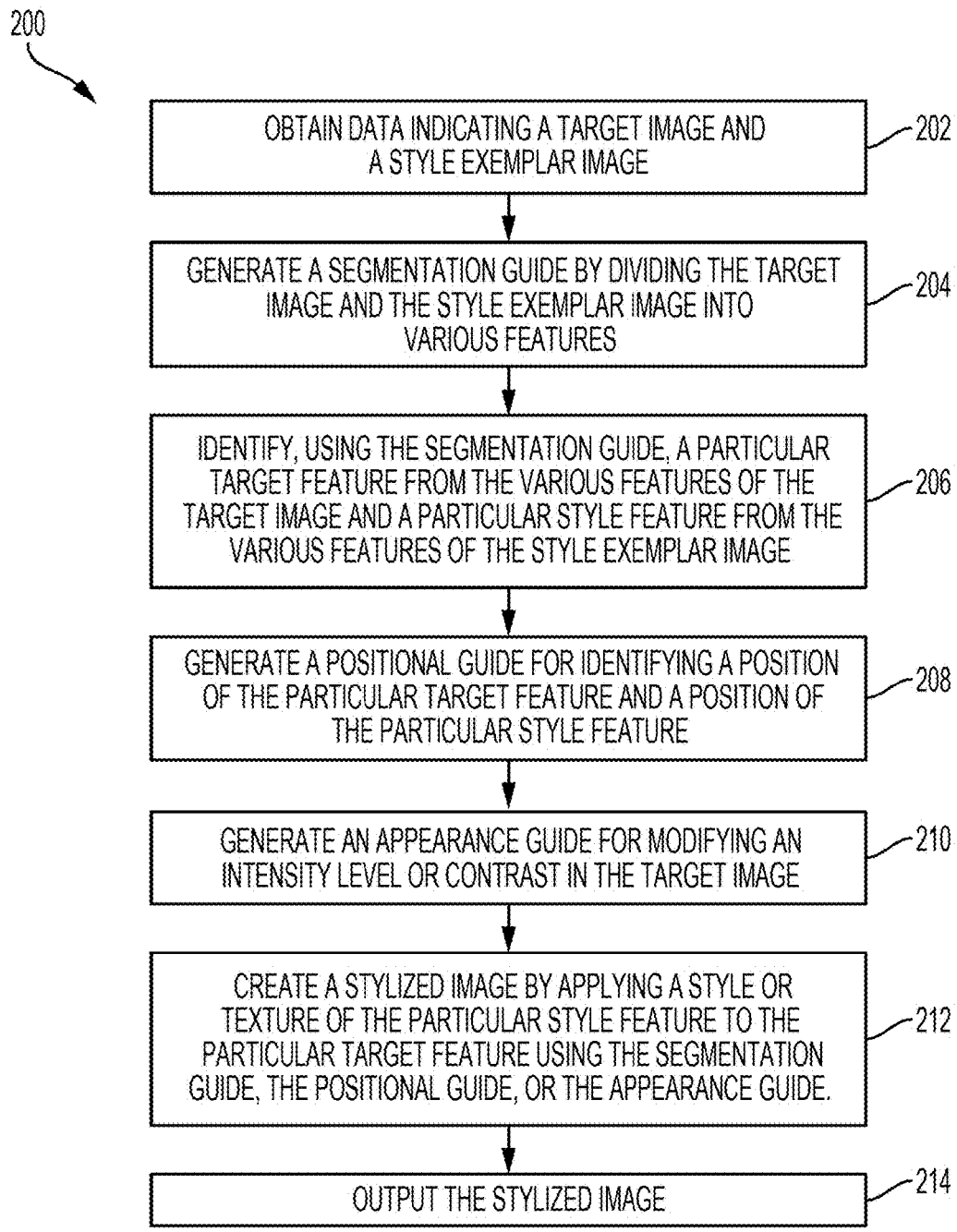
FIG. 2 is a flow chart depicting an example of a process for generating a stylized image in accordance with one or more embodiments.

FIG. 2 is a flow chart depicting an example of a process 200 for generating a stylized image in accordance with one or more embodiments. In some embodiments, one or more processing devices such as, for example, the computing system described herein with respect to FIG. 13, implement operations depicted in FIG. 2 by executing suitable program code (e.g., the computer graphics system 102 of FIG. 1) that implements one or more algorithms encompassed by the process 200. For illustrative purposes, the process 200 is described with reference to the examples depicted in FIG. 1, but other implementations are possible.

In block 202, data indicating a target image and a style exemplar image is obtained or received. In some embodiments, a computer graphics system 102 is implemented on, executed by, or stored on one or more computing devices 104. In some embodiments, the computing device 104 is communicatively or electronically coupled to a data storage unit 112 that stores various style exemplar images or target images as style exemplar data 114 and target data 116, respectively.

In some embodiments, the computer graphics system 102 includes a computer graphics application 140, which can include one or more instructions stored on a computer-readable storage medium and executable by processors of the computing device 104. When executed by the one or more processors, the computer-executable instructions of the computer graphics application 140 can cause the computer graphics system 102 to receive or obtain style exemplar data 114 that includes the style exemplar image and target data 116 that includes the target image from the data storage unit 112 via a data network 108. In another embodiment, the computing device 104 includes the data storage unit 112 and the computer graphics system 102 can access the style exemplar data 114 or the target data 116.

Figure 3:
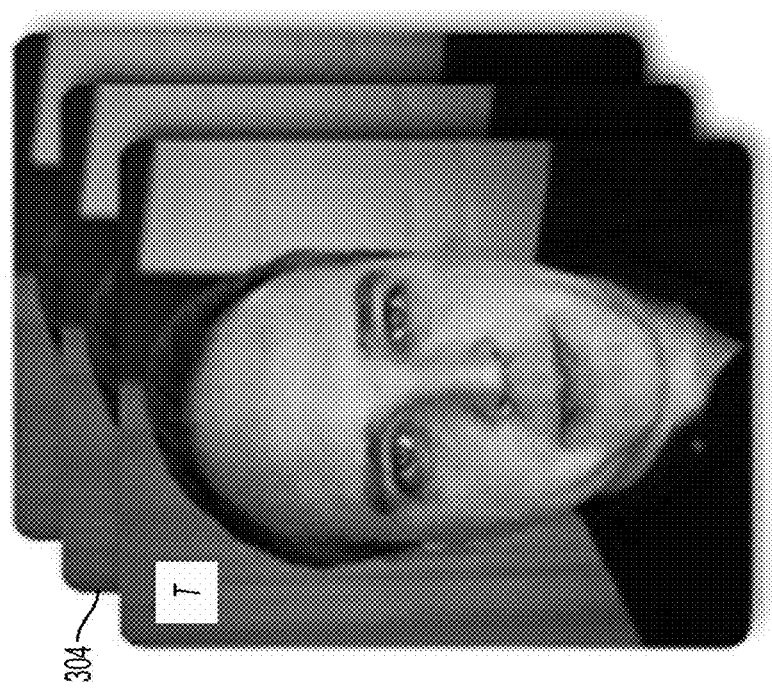
FIG. 3 shows an example of a style exemplar image and a target image in accordance with one or more embodiments.
Figure 3:
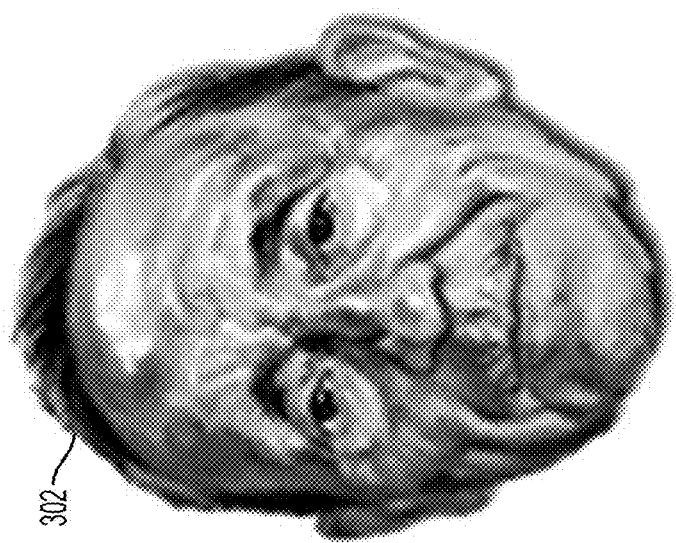

A style exemplar image can be any image or frame having one or more particular style (e.g., artistic style) or texture that can be applied to another image or frame. In some embodiments, a target image includes an image or frame to which a style or texture of a style exemplar image can be applied. In some examples, the target image can include a first character, or object and the style exemplar image can include a second character or object. In some embodiments, the character or object in the target image can be the same character or object in the style exemplar image. In another embodiment, the character or object in the target image and the character or object in the style exemplar image can be different. For example, FIG. 3 shows an example of a style exemplar image 302 and a target image 304 in accordance with one or more embodiments. In this example, the style exemplar image 302 includes an image of a person's head having an appearance according to one or more artistic styles or including one or more textures. The target image 304 includes a photograph of another person's head (e.g., a headshot).

Returning to FIG. 2, in block 204, a segmentation guide is generated by dividing the target image and the style exemplar image into various regions or features. The various regions or features can include one or more high-priority regions or features of the target image and the style exemplar image such as, for example, semantic regions or features of the target image and semantic regions or features of the style exemplar image. An example of a semantic feature can include, but is not limited to, the hair, eyebrow, nose, lip, oral cavity, eye, skin, chin, etc. of the first or second person's head in the target image and style exemplar image. In some embodiments, the computer graphics application 140 causes the computer graphics system 102 to generate the segmentation guide. As an example, and with reference to FIG. 3, the computer graphics system 102 generates the segmentation guide by dividing the person's head in the style exemplar image 302 and the target image 304 into various regions or features such as for example, dividing the person's head into the person's hair, eyebrow, nose, lip, oral cavity, eye, skin, chin, etc. In some example, the computer graphics system 102 generates the segmentation guide by dividing the person's head in the style exemplar image 302 and the target image 304 into regions or features for which an artist may use a particular stylization or texture. In some embodiments, the computer graphics application 140 uses the segmentation guide to identify or detect one or more of the various regions or features of the target image and the style exemplar image.

Figure 4:
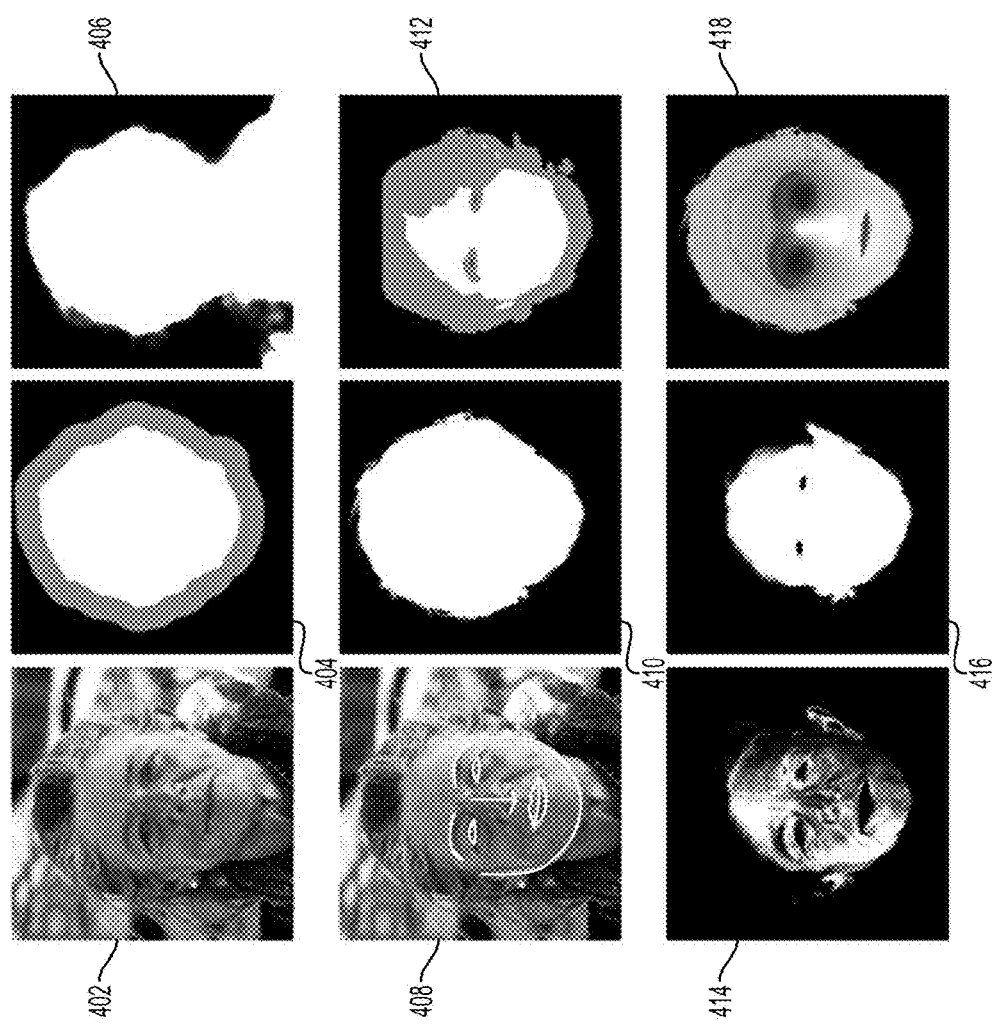
FIG. 4 is a series of images depicting an exemplary process for generating a segmentation guide by dividing a target image into various regions or features in accordance with one or more embodiments.

In some embodiments, the computer graphics application 140 causes the computer graphics system 102 to generate the segmentation guide using various methods or techniques. For example, FIG. 4 is a series 404-418 of images depicting an exemplary process for generating a segmentation guide 418 by dividing a target image 402 into various regions or features. In this example, the computer graphics system 102 determines or obtains a trimap 404 of the head of the person in the target image 402 by eroding and dislocating a foreground mask obtained by automatically segmenting the portrait in image 406.

In some embodiments, eroding and dislocating the foreground mask in this manner can allow the computer graphics system 102 to separate pixels that are assumed to be inside and outside the head region of the person in the target image 402. For example, the computer graphics application 140 can separate pixels that are assumed to be inside and outside the head region of the person in the target image 402 to detach the person's face region in the target image 402 from the person's neck region. As an example, in image 408, the computer graphics system 102 uses one or more algorithms to identify or determine a landmark, feature, or region on the face of the person in the target image 402 such as, for example, an eye, lip, oral cavity, nose, eyebrow, chin or other features of the person's face. In one example, the computer graphics system 102 identifies the person's chin by detecting a thick line of uncertain pixels on the face of the person in the target image 402. In this example, the computer graphics system 102 determines that the area beyond the thick line is outside of the person's head region and the area before the thick line is inside of the head region, which can allow the computer graphics system 102 to determine contours of the person's head region as depicted in image 408. In some embodiments, the computer graphics system 102 applies any matting algorithm such as, for example, closed-form matting, to the trimap 404 to generate a soft mask of the head of the person, as depicted in image 410.

Continuing with this example, the computer graphics application 140 causes the computer graphics system 102 to identify the skin of the person in the target image 402. For example, the computer graphics system 102 constructs a skin region trimap as depicted in image 412 using one or more algorithms such as, for example, a statistical model of the person's skin. As an example, the computer graphics system 102 converts the target image 402 to $YC_BC_R$ color space and uses a color classification algorithm to determine a likelihood of each pixel in the target image 402 being a skin pixel as depicted in image 414. As an example, the computer graphics system 102 converts the target image 402 to $YC_BC_R$ color space and fits the histogram of $C_B$ and $C_R$ components of pixels of the person's cheek with a multivariate Gaussian distribution. In this example, the computer graphics system 102 can use the multivariate Gaussian distribution to determine a likelihood of each pixel in the target image 402 being a skin pixel as depicted in image 414. The computer graphics system 102 normalizes the likelihood map, determine that all pixels above a particular threshold (e.g., 0.5 or any other suitable threshold) are part of the person's skin, and adjust the estimated trimap depicted in image 412 to generate a soft mask for the skin of the person as depicted in image 416.

In some embodiments, the computer graphics application 140 causes the computer graphics system 102 to use a pixelwise difference between the generated soft mask of the person's head depicted in image 410 and the generated soft mask for the skin of the person depicted in image 416 to segment the person's hair region from the person's skin region and generate the segmentation guide 418.

In some embodiments, the computer graphics application 140 causes the computer graphics system 102 to generate one or more soft masks for one or more other features of the person's face in the target image 402. As an example, the computer graphics system 102 detects an eye, lip, oral cavity, nose, eyebrow, or other features of the person's face as depicted in image 408 and generates a soft mask for one or more of the detected features and generates the segmentation guide 418 based on the soft mask for the various detected features. In some embodiments, detecting an exact position or location of a feature of the person's face may be difficult and the computer graphics system 102 can use one or more algorithms such as, for example, diffusion curves, to blur or determine a boundary of the feature of the person's face.

Returning to FIG. 2, in some embodiments, in block 204, the computer graphics system 102 divides the style exemplar image into one or more features or regions in substantially the same manner as described above with respect to the target image. For example, and with reference to FIG. 3, the computer graphics system 102 identifies one or more features of the person in the style exemplar image 302 and one or more features of the person in the target image 304 in substantially the same manner as described above.

In block 206, the computer graphics system 102 identifies a particular target feature from the various features of the target image identified in block 202 and a particular corresponding style feature from the various features of the style exemplar image identified in block 202. For example, the computer graphics system 102 identifies one or more of the high-priority regions or features of the target image and one or more corresponding high-priority regions or features of the style exemplar image.

In block 208, the computer graphics system 102 generates a positional guide for identifying a position of the particular target feature and a position of the particular style feature. In some examples, the computer graphics system 102 uses the positional data to match the particular target feature to the particular style feature. For example, the computer graphics system 102 generates a positional guide by determining positional data of the regions or features of the target image or the style exemplar image. In some embodiments, the computer graphics application 140 causes the computer graphics system 102 to generate the positional guide. For example, and with reference to FIG. 3, the computer graphics system 102 generates a positional guide by determining a position or location of the various identified features of the first and second person's head in the style exemplar image 302 and the target image 304 (e.g., a position or location of an eye, lip, oral cavity, nose, eyebrow, or other features of the person's head). In some embodiments, the computer graphics system 102 determines the position or location of a feature of the person's head in the style exemplar image 302 and the target image 304 relative to a grid or coordinate system (e.g., a common grid or coordinate system). In this embodiment, the computer graphics system 102 uses the positional data about the various identified features of the style exemplar image and the target image (e.g., the positions or locations of the various identified features of the first and second person's head in the style exemplar image 302 and the target image 304) to match a feature of the target image to a feature of the style exemplar image. For example, the computer graphics system 102 uses data about the location of the nose of the person in the target image and the nose of the person in the style exemplar image to match the two noses.

In some embodiments, computer graphics application 140 can cause the computer graphics system 102 to generate the positional guide using various methods or techniques. For example, the computer graphic system 102 generates a positional guide for the style exemplar image by normalizing encoded (x, y) coordinates of each pixel in the style exemplar image to a range between zero and one. In this example, the computer graphics system 102 uses the detected features or regions of the style exemplar image (e.g., the features of the head of the person in the style exemplar image detected in block 204) and corresponding features or regions of the target image (e.g., corresponding features of the head of the person in the target image detected in block 204) to generate a positional guide for the target image. The computer graphics system 102 warps the positional guide for the style exemplar image using one or more algorithms such as, for example, moving least squares deformation, which includes using positions and connections of detected features of the target image as control lines to specify constraints for a resulting deformation field. In some embodiments, the positional guide for the style exemplar and positional guide for the target image can be used to encourage patches of the style exemplar image to be transferred to similar relative positions in the target image.

In block 210, an appearance guide for modifying an intensity level or contrast value in the target image (e.g., an intensity level or contrast level at a location on the first person's head in the target image) is generated. In some examples, the computer graphics application 140 causes the computer graphics system 102 to use the appearance guide to adjust or modify the intensity level or contrast value in the target image based on the intensity level or contrast value in the style exemplar image. For example, the computer graphics system 102 generates an appearance guide for the target image and an appearance guide for the style exemplar image such that various intensity levels or contrast values in the appearance guide for the target image match corresponding intensity levels or contrast values in the appearance guide for the style exemplar image.

In some embodiments, the computer graphics system 102 generates the appearance guide using various methods or techniques. For example, the computer graphics system 102 generates the appearance guide by generating a converted target image and a converted style exemplar image by converting the target image and the style exemplar image to grayscale. The computer graphics system 102 can then determine or identify a global intensity level and a local and/or global contrast of the converted grayscale target image and a global intensity level and a local and/or global contrast of the converted style exemplar image. In some embodiments, the computer graphics system 102 can then normalize or equalize the converted grayscale target image and the converted grayscale style exemplar image by modifying the global intensity level of the converted grayscale target image to match the global intensity level of the converted grayscale style exemplar image. The computer graphics system 102 can modify the converted grayscale target image by modifying the local and global contrast of the converted grayscale target image to match the local and global contrast value of the converted grayscale style exemplar image. An example of an algorithm that can be used by the computer graphics system 102 to modify the global intensity level and/or the local and global contrast of the converted grayscale target image to correspond to the global intensity level and/or the local and contrast of the converted grayscale style exemplar image is described in Y. Shih et al., "Style Transfer for Headshot Portraits," Volume 33, Issue 4 ACM TRANSACTIONS ON GRAPHICS (TOG)—PROCEEDINGS OF ACM SIGGRAPH, Article No. 148 (July 2014), available at http://people.csail.mit.edu/billf/publications/SIGGRAPH2014_portrait.pdf, which is incorporated by reference herein. In some embodiments, the computer graphics system 102 can then identify a set of pixels in the converted grayscale target image that has an intensity level that matches an intensity level of a set of pixels in the converted grayscale style exemplar image. The computer graphics system 102 can transfer a style or texture of the unconverted style exemplar image to the unconverted target image using the identified set of pixels in the converted grayscale style exemplar image, which can preserve an identity of a subject in the target image while retaining a textural richness of the style exemplar image. For example, the computer graphics system 102 transfers a style or texture at or near the identified set of pixels to a corresponding location or position in the target image.

In some embodiments, the computer graphics system 102 may modify the appearance guide for certain features or regions of the target image. For example, the computer graphics system 102 can add a weighting channel that boosts an influence or effect of the appearance guide at certain pixels of the target image, which can balance preserving the identity of the person in the target image and retaining the textural richness of the style exemplar image. As an example, the computer graphics system 102 adds a weighting channel to boost the effect of the algorithm used to generate the appearance guide for the target image and the style exemplar image at pixels near the eye or oral cavity region of the person in the target image such that the pixels match the intensity level or contrast value in corresponding areas or regions in the style exemplar image. In some embodiments, the computer graphics system 102 obtains or receives data indicating the one or more weighting channels or values for the weighting channels from user input.

Figure 5:
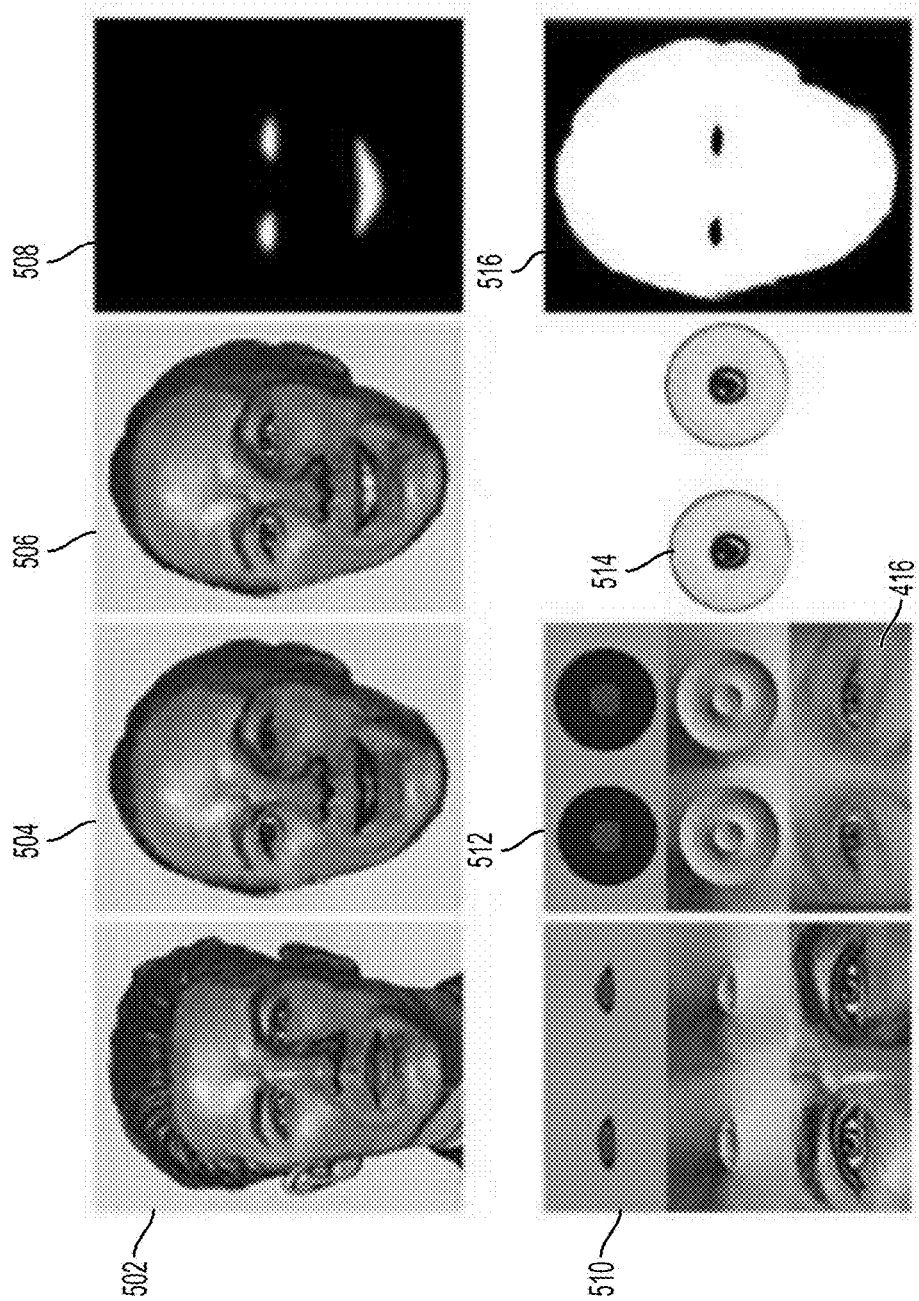
FIG. 5 is a series of images depicting an exemplary process for modifying an appearance guide for features or regions of a target image in accordance with one or more embodiments.

For example, FIG. 5 is a series of images 502-516 depicting an exemplary process for modifying the appearance guide for features or regions of the target image.

In this example, a person in a style exemplar image 502 has a closed mouth and a target image (not shown) includes an image showing a person's teeth. In some examples, the segmentation guide, positional guide, or appearance guide described above may bias synthesis toward using lip patches or textures from the style exemplar image 502 for the person's teeth in the target image when generating a stylized image, which can cause an unnatural or unappealing stylized image 504. Thus, in some embodiments, the computer graphics application 140 causes the computer graphics system 102 to generate a mask with an increased weight for the appearance guide using one or more detected regions or features of the target image (e.g., the detected regions or features described with respect to block 204). In the example depicted in FIG. 5, the computer graphics system 102 generates a mask with an increased weight for the appearance guide using the eyes and mouth regions of the person in the target image as shown in image 508. In some embodiments, the computer graphics system 102 uses the mask to guide the synthesis of the style exemplar image 502 and the target image to transfer lighter texture areas of the style exemplar image 502 to the teeth of the person in the target image, which can create a more plausible stylized image depicted in stylized image 506.

In some examples, defects in the styling or generating the eye region of a stylized animation can lead to undesirable stylized images. In this example, the eyes of the person in the stylized images may not resemble the style exemplar such as, for example, as shown in stylized image 504. Thus, in some embodiments, the computer graphics system 102 synthesizes eyes of a person in the style exemplar image and a person in the target image based on a particular set of guiding channels having only a hard segmentation (e.g., iris vs. sclera) and a normal map as depicted in images 510, 512. In this example, the stylized eyes are depicted in image 514. Continuing with this example, after synthesizing the face of the person in the style exemplar image and the face of the person in the target image, the computer graphics system 102 can blend in the synthesized eyes depicted in image 514 with the rest of the face of the person in the target image using a soft mask of the target head to generate the stylized image 506.

In block 212, a stylized image is generated or created by applying a style or texture of the particular style feature to the particular target feature using the segmentation guide, the positional guide, or the appearance guide. In some example, the computer graphics application 140 causes the computer graphics system 102 to generate the stylized image.

In some embodiments, the computer graphics system 102 uses the segmentation guide to identify a particular semantic feature of the target image and a particular corresponding semantic feature of the style exemplar image (e.g., in block 206). The computer graphics system 102 can use the positional guide to identify a position or location of the particular semantic feature of the target image and a position or location of the corresponding semantic feature of the style exemplar image (e.g., in block 208). The computer graphics system 102 can use the segmentation guide and the positional guide to create a mapping between the two semantic features, which allows the computer graphics system 102 to apply textures or styles of the semantic feature of the style exemplar image to the corresponding semantic feature of the target image. (e.g., textures from sideburns of a person in the style exemplar image are applied to sideburns of a person in the generated stylized image). For example, and with reference to FIG. 3, the computer graphics system 102 uses the segmentation guide to identify a nose of the person in the style exemplar image 302 and the nose of the person in the target image 304. The computer graphics system 102 uses the positional guide to identify or determine the position of the person's nose in the style exemplar image 302 and the position of the person's nose in the target image 304 relative to a common grid. In this example, the computer graphics system 102 uses the segmentation guide and positional guide to determine or identify a texture at a location on the person's nose in the style exemplar image 302 and to identify a location or position on the nose of the person in the target image 304 that is similar to the location on the nose of the person in the style exemplar image 302 (e.g., a location that is similarly located or position on the grid or coordinate system). In this example, the computer graphics system 102 applies the texture from the location on the nose of the person in the style exemplar image 302 to the similar location or position on the person's nose in the target image 304.

The computer graphics system 102 uses the appearance guide and the positional guide to further stylize the target image by adjusting an intensity level or contrast value at the location of semantic feature of the target image to correspond to an intensity level or contrast value at the location of the semantic feature of the style exemplar image. For example, and with reference to FIG. 3, the computer graphics system 102 uses the positional guide to determine the position of the person's nose in the style exemplar image 302 and the position of the person's nose in the target image 304 relative to a common grid. The computer graphics system 102 uses the appearance guide to determine an intensity level or contrast value at or near the nose of the person in the style exemplar image 302 and an intensity level or contrast value at or near the nose of the person in the target image 304. In this example, the computer graphics system 102 adjusts the intensity level or contrast value at or near the nose of the person in the target image 304 such that the intensity or contrast value corresponds to the intensity or contrast value at or near the nose of the person in the style exemplar image.

In some embodiments, in block 212, the computer graphics system 102 generates the stylized image using one or more algorithms such as, for example, a guided texture synthesis algorithm. An example of a guided texture synthesis algorithm that can be used by the computer graphics system 102 to generate a stylized image is described in J. Fišer et al., "StyLit: Illumination-guided example based stylization of 3D renderings," Volume 35, Issue 4 ACM TRANSACTIONS ON GRAPHICS (TOG)—PROCEEDINGS OF ACM SIGGRAPH, Article No. 92 (July 2016), available at http://dcgi.fel.cvut.cz/home/sykorad/Fiser16-SIG.pdf http://people.csail.mit.edu/billf/publications/SIGGRAPH2014_portrait.pdf, which is incorporated by reference herein.

In some examples, generating the stylized image based on a guided texture synthesis such as, for example, using the guided texture synthesis algorithm described in J. Fšer et al., "StyLit: Illumination-guided example based stylization of 3D renderings," Volume 35, Issue 4 ACM TRANSACTIONS ON GRAPHICS (TOG)—PROCEEDINGS OF ACM SIGGRAPH, Article No. 92 (July 2016), available at http://dcgi.fel.cvut.cz/home/svkorad/Fiser16-SIG.pdf, includes generating the stylized image based on light propagation in the style exemplar image. For example, the computer graphics system 102 receives a style exemplar image and computes or calculates light propagation in the style exemplar image (e.g., determines light propagation at a region or location at or near one or more features of the style exemplar image). The computer graphics system 102 can use the computed light propagation in the style exemplar image to generate a stylized image by applying the light propagation from the particular region or feature in the style exemplar to a corresponding region or feature in the target image. As an example, and with reference to FIG. 3, the computer graphics system 102 uses the segmentation guide to identify the person's nose in the style exemplar image 302 as a high-priority style feature and identify the person's nose in the target image 304 as a high-priority target feature. The computer graphics system 102 use the positional guide to determine the position of the person's nose in the style exemplar image 302 and the position of the person's nose in the target image 304 relative to a common grid. The computer graphics system 102 can compute light propagation at or near the position of the nose of the person in the style exemplar image 302. In this example, the computer graphics system 102 transfers or applies the light propagation at or near the nose of the person in the style exemplar image 302 to a region or area at or near the nose of the person in the target image 304. In this manner, the computer graphics system 102 can generate a stylized image such that the shadow, highlight, or diffuse regions in the stylized image exhibit a similar visual style to the corresponding regions in the style exemplar image 302. In some examples, generating a stylized image as described above can preserve the stylization of individual illumination effects. In some embodiments, the computer graphics system 102 can compute light propagation at a region or location at or near various features of the style exemplar image and applies the computed light propagation from the various regions or locations in the style exemplar image to various corresponding regions or locations in the target image.

In some embodiments, generating the stylized image based on a guided texture synthesis such as, for example, using the guided texture synthesis algorithm described in J. Fišer et al., "StyLit: Illumination-guided example based stylization of 3D renderings," Volume 35, Issue 4 ACM TRANSACTIONS ON GRAPHICS (TOG)—PROCEEDINGS OF ACM SIGGRAPH, Article No. 92 (July 2016), available at http://dcgi.fel.cvut.cz/home/sykorad/Fiser16-SIG.pdf, can provide one or more advantages. For example, using the guided texture synthesis algorithm can suppress the "wash-out" effect of other texture synthesis techniques based on the original texture optimization strategy. In some embodiments, the computer graphics system 102 can also rotate the style exemplar image to match the dominant rotation of the person's face in the target image, which can cause the change of the style exemplar to be consistent with the global orientation difference between the style exemplar image and patches of the target image. In some examples, the computer graphics system 102 rotates the style exemplar image by estimating the closest relative rotation that aligns corresponding regions or features of the style exemplar image and the target image to have a minimal distance in the least squares sense using a closed-form solution.

Figure 6:
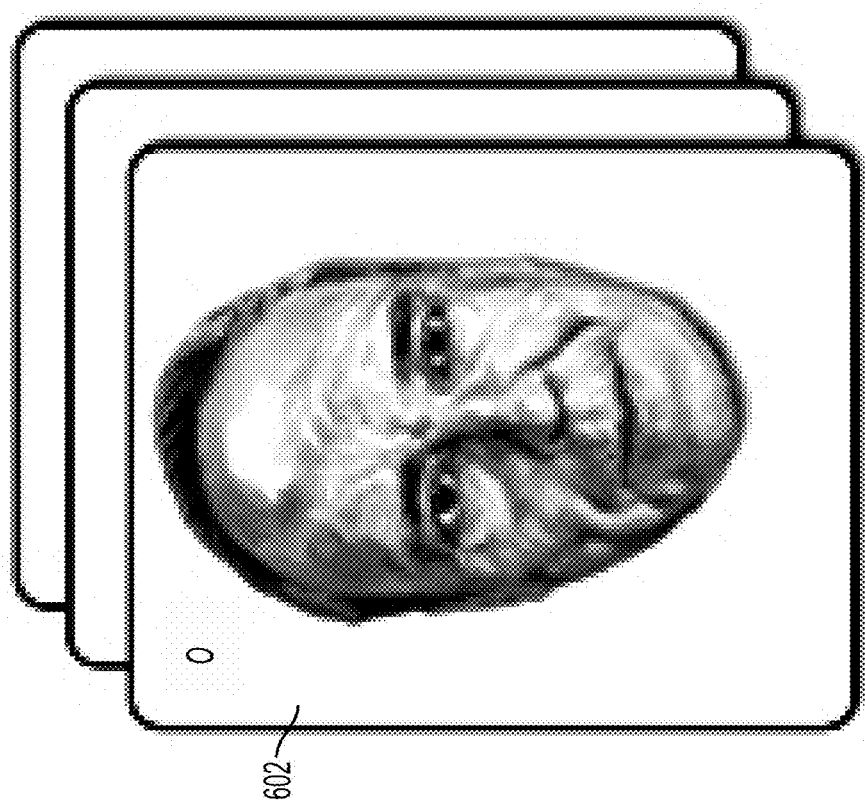
FIG. 6 shows an example of a stylized image that can be generated by a computer graphics system in accordance with one or more embodiments.

In some embodiments, the computer graphics application 140 causes the computer graphics system 102 to generate the stylized image in which the style or texture of the style exemplar image has been applied to the target image. For example, FIG. 6 shows an example of a stylized image 602 that can be generated by a computer graphics system 102. In this example, the computer graphics system 102 can generate and output the stylized image 602 in which the artistic style or texture of the style exemplar image 302 of FIG. 3 has been applied to the target image 304 of FIG. 3.

In this manner, the computer graphics system 102 uses various algorithms to generate stylized images or frames that preserve the identity of an object or character in the target image (e.g., stylized images that preserve the identity of the first person in the target image) and the visual richness of the style exemplar image (e.g., by retaining the local textural details of the style exemplar image) when applying a texture or style of the style exemplar image to the target image. In some embodiments, the computer graphics system 102 can apply a desired texture or style from a style exemplar to a target image or frame to generate a stylized image or frame that does not include warped or distorted features.

In block 214, the stylized image is output. In some embodiments, the computer graphics application 140 causes the computer graphics system 102 to generate one or more user interfaces for outputting or displaying the stylized image.

In some embodiments, one or more of the operations described above with respect to FIG. 2 can be used to generate a stylized video or animation. For instance, the computer graphics application 140 causes the computer graphics system 102 to generate a stylized video or a stream of stylized images. In this example, the computer graphics application 140 causes the computer graphics system 102 to generate a temporal guide for generating the stylized video or stylized animation. The computer graphic system 102 can use the temporal guide to control an amount of temporal flickering in the stylized video or stream of stylized images. For example, the computer graphics system 102 can generate a temporal guide that can be used to generate a stylized video that preserves an appearance of a sequence of images having a particular artistic style or texture that can exhibit a certain amount of temporal flickering. In some embodiments, the computer graphics system 102 uses the temporal guide to determine an amount of temporal flickering for a stylized video and controls the temporal flickering in the stylized video based on the determined amount such that the stylized video preserves an appearance of a sequence of hand-drawn images and exhibits a certain amount of temporal flickering. Thus, in certain examples, the computer graphics system 102 can be used to create stylized videos with less than full temporal coherence by allowing a controllable amount of temporal flickering.

Certain embodiments of the present disclosure provide several advantages over existing methods and systems for generating stylized videos. For example, some existing computer graphics systems are limited to generating stylized videos with full temporal coherence by causing a previously generated stylized image $O_{t-1}$ to be advected by the underlying motion field and used as a guide to generate a new or subsequent stylized image in the stylized video. However, stylized videos having full temporal coherence do not preserve an appearance of a sequence of, for example, hand-drawn images, which exhibit a certain amount of temporal dynamics. Moreover, some existing methods and systems that allow introduction of temporal noise into an existing sequence of stylize images assume that low-frequency content (e.g., content having a lower amount detail) of a style exemplar image and target image are the same, which can allow synthesis or generation of a stylized video to begin at a certain resolution level. However, such systems and methods may not be useful if the style exemplar image differs significantly from the target image and thus may not be used for generating stylized videos with less than full temporal coherence. Certain embodiments of the present disclosure address these issues by generating stylized videos using a temporal guide that allows a controllable amount of temporal flickering and preserves temporal coherence at certain frequencies (e.g., at lower frequencies). For example, the computer graphics system 102 generates a temporal guide that includes blurred versions of a style exemplar image and blurred versions of a motion-warped version of a previous image or frame of a sequence of frames and images, which can allow the temporal guide to provide temporal coherency in the temporal domain. In some embodiments, an amount of blur of each blurred version of the style exemplar image or each blurred version of the motion-warped version of a previous image can be a controlled by the computer graphic system 102. In this example, the computer graphics system 102 determines the amount of blur of each blurred version of the style exemplar image or each blurred version of the motion-warped version of a previous image, which can allow the computer graphics system 102 to control an amount of temporal flickering in the generated sequence of stylized image or in the stylized video.

In some embodiments, the computer graphics system 102 generates the temporal guide using various methods or techniques. For example, the computer graphics system 102 generates the temporal guide by blurring a style exemplar image (e.g., the style exemplar image 302 of FIG. 3) and a previously generated stylized image or frame $O_{t-1}$ after advection and uses the blurred style exemplar image and the previously generated stylized image or frame $O_{t-1}$ as the temporal guide. In some embodiments, the computer graphics system 102 uses a pair of: i) a blurred style exemplar image; and ii) a blurred optical-flow-advected previously generated stylized image or frame as the temporal guide. In some such examples, using the pair as the temporal guide can allow the computer graphics system 102 to have improved control over the synthesis process.

In some embodiments, the temporal guide encourages a synthesis algorithm used by the computer graphics system 102 to use patches from the style exemplar image that have an appearance similar to a previously stylized image or frame (e.g., a previously stylized image or frame that is motion-warped to be aligned with a currently synthesized frame). In some examples, an increasing amount of blur in the temporal guide can provide freedom to the synthesis algorithm by encouraging consistency on a low frequency domain and allowing mismatch at high frequencies, which can cause temporal flickering in a finalized synthesized sequence of images or animation.

In some examples, the computer graphics system 102 can generate a stylized video or stream of stylized images based on the segmentation guide, the positional guide, the appearance guide, and the temporal guide using one or more algorithms. In some examples, the computer graphics system 102 generates the stylized video or stream of stylized images based on the segmentation guide, the positional guide, the appearance guide, and the temporal guide using various algorithms described above. In this embodiment, the computer graphics system 102 can output the stylized video or animation via one or more user interfaces.

Figure 7:
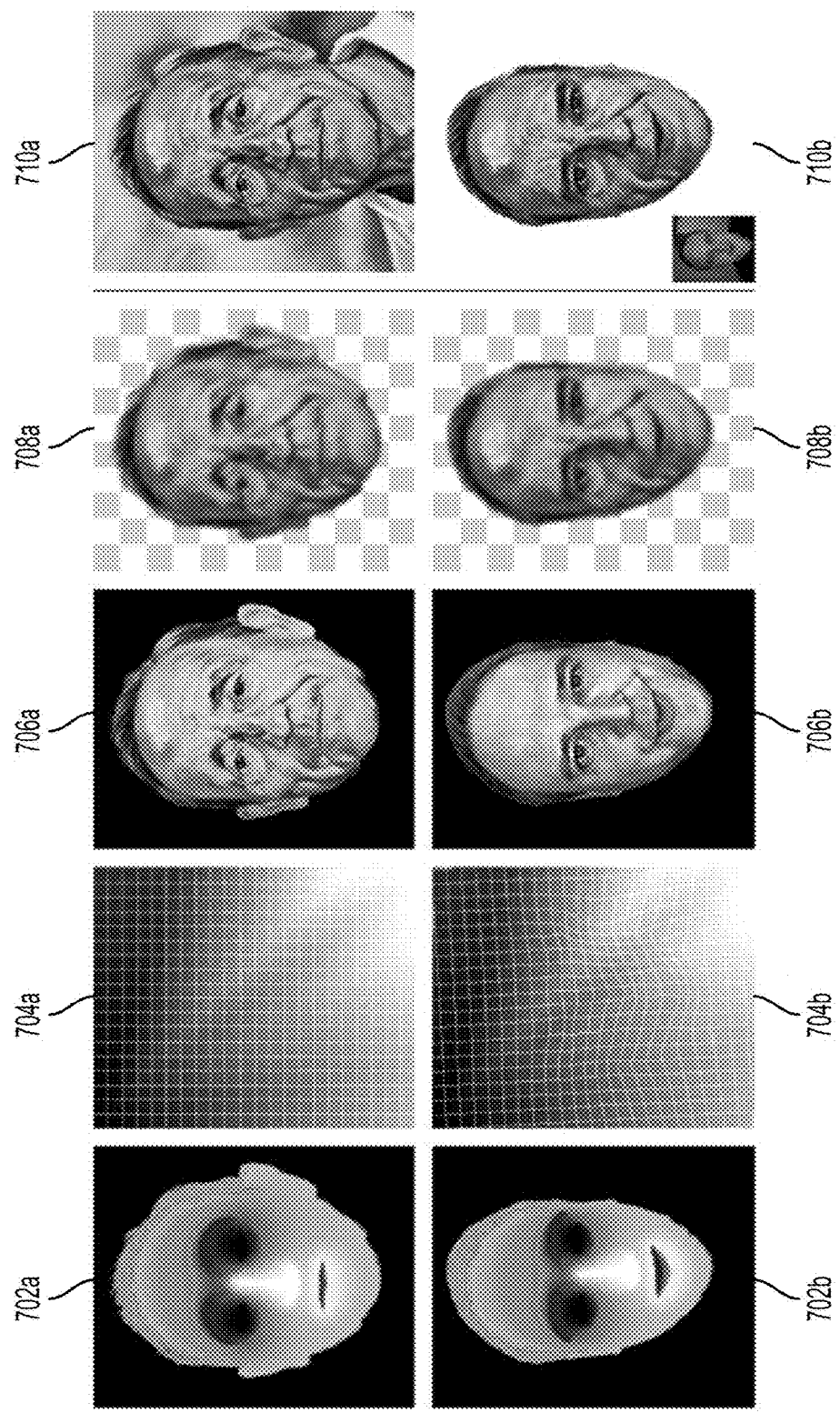
FIG. 7 shows an overview of a segmentation guide, a positional guide, an appearance guide, and a temporal guide used to generate a stylized image or animation in accordance with one or more embodiments.

FIG. 7 shows an overview of a segmentation guide, a positional guide, an appearance guide, and a temporal guide used to generate a stylized image or animation in accordance with one or more embodiments. For illustrative purposes, the images depicted in FIG. 7 are described with reference to the process 200 of FIG. 2.

In the example depicted in FIG. 7, the images 702a-710a correspond to a style exemplar image (e.g., the style exemplar image 302 of FIG. 3) and the images 702b-710b correspond to a target image (e.g., the target image 304 of FIG. 3). In this example, images 702a, 702b show segmentation guide channels for the style exemplar image and the target image, respectively (e.g., the segmentation guide generated in block 204 of FIG. 2). Images 704a, 704b show positional guide channels for the style exemplar image and the target image, respectively (e.g., the positional guide generated in block 206 of FIG. 2). Images 706a, 706b show appearance guide channels for the style exemplar image and the target image, respectively (e.g., the appearance guide generated in block 208 of FIG. 2). Images 708a, 708b show temporal guide channels for the style exemplar image and the target image, respectively (e.g., the temporal guide generated in block 210 of FIG. 2). Images 710a shows the style exemplar image and image 712a shows a stylized image in which the artistic style or texture of the style exemplar image has been applied to the target image.

Figure 8:
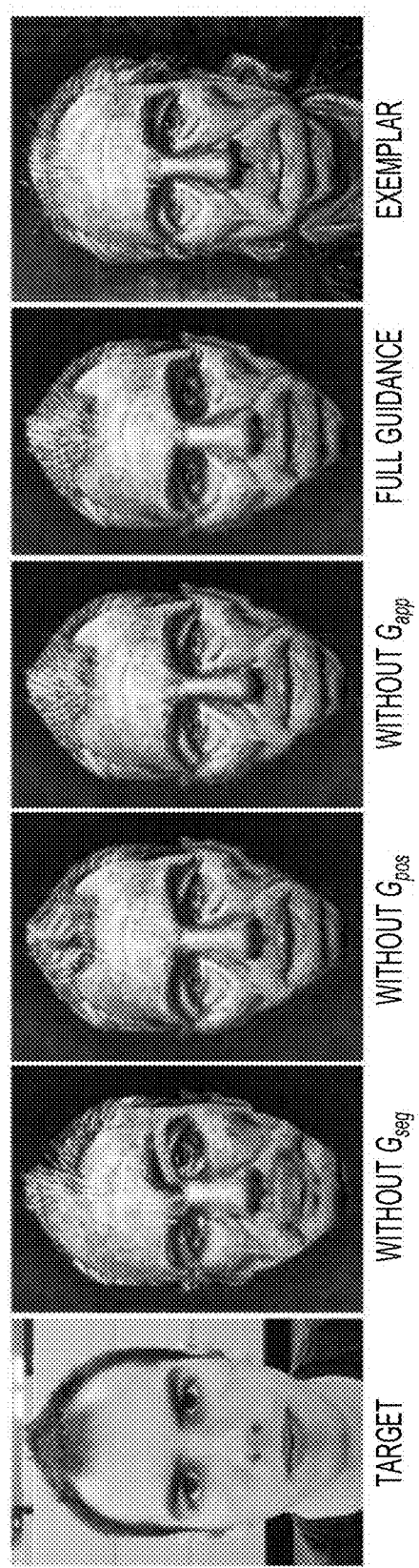
FIG. 8 shows images depicting an effect of a segmentation guide, a positional guide, and an appearance guide on a stylized image or animation in accordance with one or more embodiments.

FIG. 8 shows images depicting an effect of a segmentation guide, a positional guide, and an appearance guide on a stylized image or animation in accordance with one or more embodiments. As depicted in FIG. 8, using each of the segmentation guide, a positional guide, and the appearance guide individually to generate a stylized image or animation may generate a stylized image or animation that does not accurately reflect a texture or artistic style of a style exemplar image. For example, generating a stylized image without the segmentation guide can cause a computer graphics system to use patches from the style exemplar in locations that are not semantic. In some instances, generating a stylized image without the positional guide can cause the computer graphics system to use the semantic patches at distant locations (e.g., patches from the sideburns of the person in the style exemplar image are used on top of the head of the generated stylized image). In some instances, generating a stylized image without the appearance guide can cause the computer graphics system to generate a stylized image that does not preserve the identity of the person in the target image (e.g., a stylized image in which the width of the nose and eye size of the person in the target image is not accurately represented or preserved).

Figure 9:
FIG. 9 shows examples of stylized images generated by a computer graphics system of the present disclosure and stylized images generated by existing computer graphic systems in accordance with one or more embodiments.

FIG. 9 shows examples of stylized images 902, 904 generated by a computer graphics system 102 of the present disclosure and stylized images 906, 908 generated by existing computer graphic systems. In this example, the stylized images 902, 906 are generated to mimic the artistic style or texture of the style exemplar image 910 and the stylized images 904, 908 are generated to mimic the artistic style or texture of the style exemplar image 912. As shown in this example, stylized images 906, 908 generated by existing computer graphic systems suppress local visual features of the style exemplar image 910,912, which can result in the stylized images 906,908 having an appearance that differs significantly from the original style exemplar images 910, 912. In contrast, the stylized images 902, 904 generated by the computer graphics system 102 of the present disclosure more precisely resemble the original style exemplar images 910, 912. Moreover, as shown via the arrow in FIG. 9, existing computer graphic systems introduce warping artifacts (e.g., elongation and smearing) when generating stylized images 908, which can be caused by alignment of the style exemplar image 912 to the target image (not shown). In contrast, in some embodiments, the computer graphics system 102 can generate the stylized image 904 without warping the style exemplar image 912, which can allow the computer graphics system 102 to generate the stylized image 904 that does not include warped or distorted features.

Figure 10:
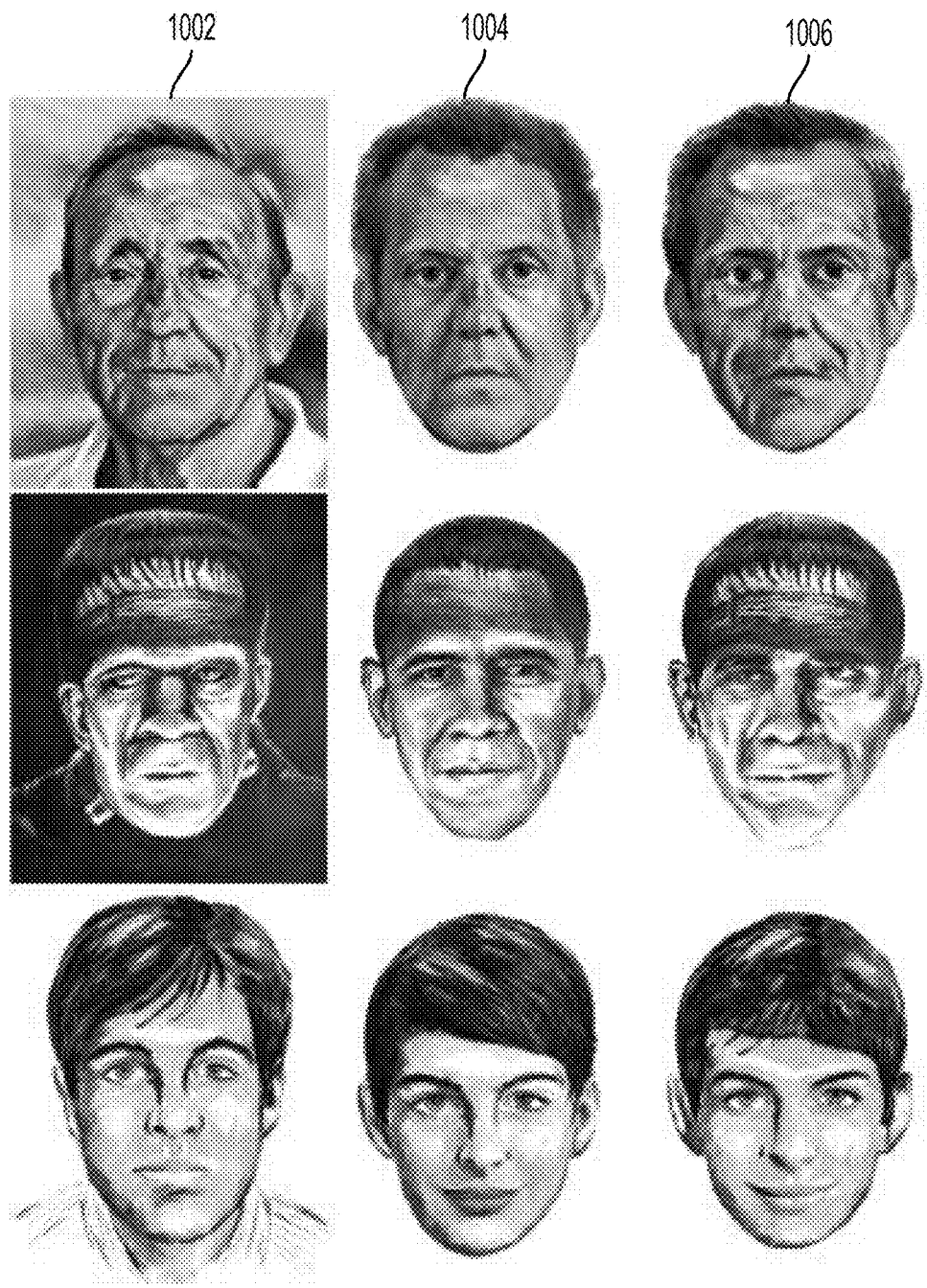
FIG. 10 shows other examples of stylized images generated by a computer graphics system of the present disclosure and stylized images generated by existing computer graphic systems in accordance with one or more embodiments.

FIG. 10 shows other examples of stylized images generated by a computer graphics system 102 of the present disclosure and stylized images generated by existing computer graphic systems in accordance with one or more embodiments. In the example depicted in FIG. 10, column 1002 shows various style exemplar images. Column 1004 shows various stylized images generated by existing computer graphic systems and column 1006 shows various stylized images generated by a computer graphics system 102 of the present disclosure. As shown in FIG. 10, the stylized images generated by the computer graphics system 102 show improvements over stylized images generated by existing computer graphic systems by preserving an identity of a character in the target image and the local textural details the style exemplar image.

Figure 11:
FIG. 11 shows other examples of stylized images that can be generated by a computer graphics system in accordance with one or more embodiments.

FIG. 11 shows other examples of stylized images that can be generated by a computer graphics system in accordance with one or more embodiments. In this example, the computer graphics system 102 has applied various style exemplar images shown across the top or first row to various target images shown in the first column to generate various stylized images.

Figure 12:
FIG. 12 shows another example of a stylized image that can be generated by a computer graphics system in accordance with one or more embodiments.

In some instances, the computer graphics system 102 described herein can be used to perform inverse stylization methods or techniques. For example, FIG. 12 shows another example of a stylized image that can be generated by a computer graphics system in accordance with one or more embodiments. In this example, a photograph 1202 of a real subject is used a style exemplar image and the computer graphics system 102 applies the style or texture of the photograph 1202 to a sketch 1204 to generate a stylized animation 1206. The stylized animation 1206 resembles the original photograph 1202 while retaining the overall structure of the sketch.

Figure 13:
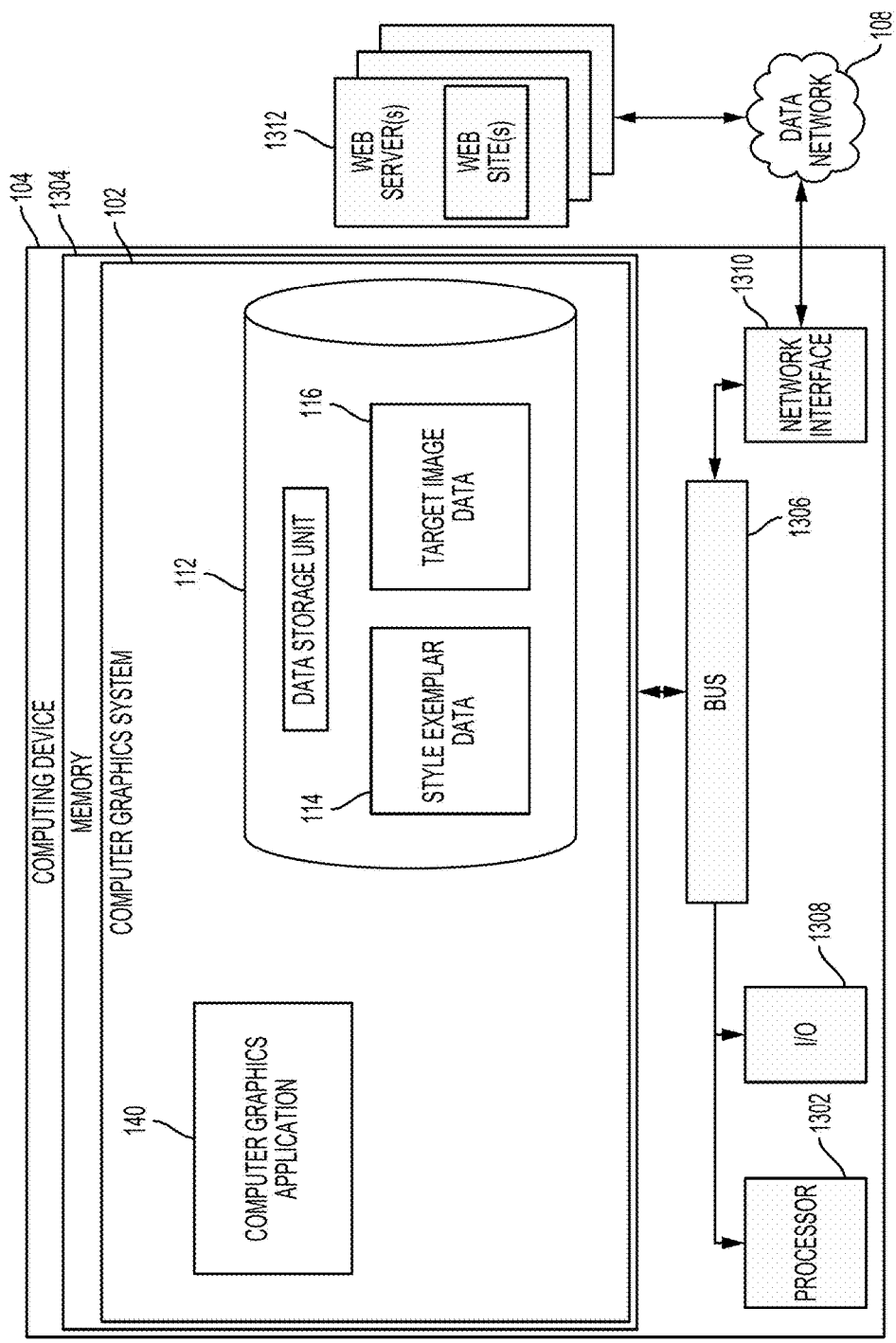
FIG. 13 is an example of a block diagram of a computing device that executes a computer graphics system to generate a stylized image or animation in accordance with one or more embodiments.
Figure 14:
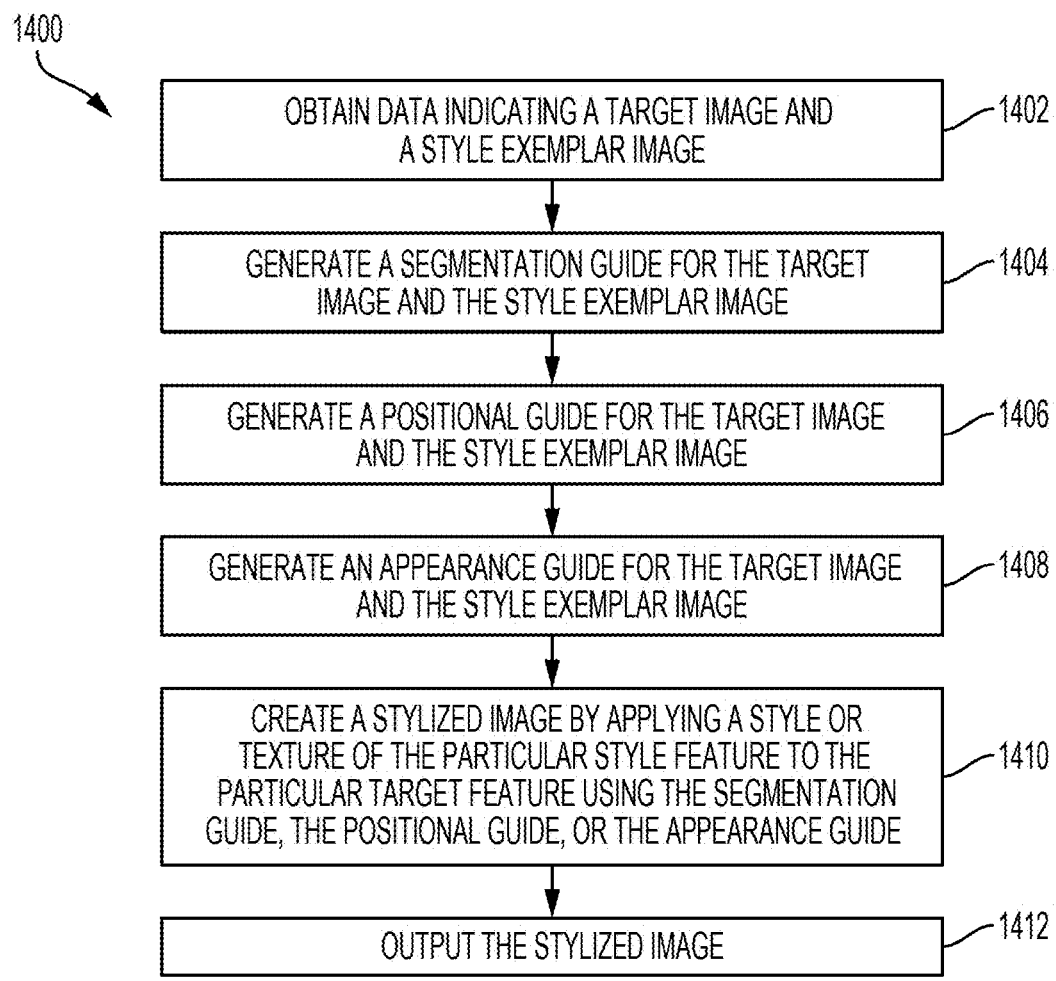
FIG. 14 is a flow chart depicting another example of a process for generating a stylized image in accordance with one or more embodiments.

FIG. 14 is a flow chart depicting another example of a process 1400 for generating a stylized image in accordance with one or more embodiments. In some embodiments, one or more processing devices such as, for example, the computing system described herein with respect to FIG. 13, implement operations depicted in FIG. 14 by executing suitable program code (e.g., the computer graphics system 102 of FIG. 1) that implements one or more algorithms encompassed by the process 1400. For illustrative purposes, the process 1400 is described with reference to the examples depicted in FIG. 1, but other implementations are possible.

In block 1402, data indicating a target image and a style exemplar image is obtained or received. In some embodiments, a computer graphics system 102 implemented on, executed by, or stored on one or more computing devices 104 obtains the data indicating the target image and the style exemplar image in substantially the same manner as described with respect to block 202 of FIG. 2.

In block 1404, a segmentation guide is generated for the target image and the style exemplar image. In some embodiments, a computer graphics application 140 of the computer graphics system 102 causes the computer graphics system 102 to generate the segmentation guide using various methods or techniques.

For example, the target image can include a first character and the style exemplar image can include a second character. The computer graphics system 102 can generate the segmentation guide for the target image and the style exemplar image by creating a head soft mask of the first character and another head soft mask of the second character. In some examples, the computer graphics system 102 can generate the segmentation guide by creating a hair region soft mask of the first character in the target image and another hair region soft mask of the second character in the style exemplar image. In some embodiments, the computer graphics system 102 can generate the segmentation guide by identifying one or more target features of the target image and one or more style features of the style exemplar image. As an example, the computer graphics system 102 identifies the hair, eyebrow, nose, lip, oral cavity, eye, skin, chin, etc. of the first and second character of the target and style exemplar image. The computer graphics system 102 can generate the segmentation guide by creating a soft mask for one or more of the identified target features of the target image or style features of the style exemplar image using one or more algorithms such as, for example, diffusion curves, which can be used to blur or determine a boundary of target feature or style feature.

In some embodiments, the computer graphics system 102 can create the head soft mask of the first and second character by removing a foreground mask from the target image to create a trimap of the first character and removing a foreground mask from the style exemplar image to create a trimap of the second character. The computer graphics system 102 can then identify one or more landmark features (e.g., an eye, lip, oral cavity, nose, eyebrow, chin, etc.) of the first character and refine the trimap of the first character using the identified landmark feature. The computer graphics system 102 can also identify one or more landmark features of the second character and refine the trimap of the second character using the identified landmark feature. In one example, the computer graphics system 102 refines the trimap of the first or second character by detecting a line of uncertain pixels on the face of the first or second character and determining that an area beyond the line of uncertain pixels is outside of the head of the first or second character and an area before the line is inside of the head region, which can allow the computer graphics system 102 to determine contours of the head region of the first or second character. In this example, the computer graphics system 102 can apply any matting algorithm such as, for example, closed-form matting, to the refined trimap of the first and second characters to generate the head soft mask of the first and second characters.

In some embodiments, the computer graphic system 102 can create the hair region soft mask of the first character and second character by generating a skin region trimap for each of the first and second characters. For example, the computer graphics system 102 can generate a skin region trimap for the first and second character by converting the target image and the style exemplar image to $YC_BC_R$ color space and determining a likelihood of each pixel in the target image and each pixel in the style exemplar image being a skin pixel using a color classification algorithm such as, for example, by fitting a histogram of $C_B$ and $C_R$ components of pixels in the target image and pixels in the style exemplar image with a multivariate Gaussian distribution. In this example, the computer graphic system 102 can determine the likelihood of each pixel in the target image and style exemplar image being a skin pixel by comparing the pixel to a threshold value (e.g., 0.5 or any other suitable threshold value) and determining that the pixel is a skin pixel if the pixel is above the threshold value. Continuing with this example, the computer graphics system 102 can create a skin region soft mask for the first character in the target image based on the generated skin region trimap for the first character. The computer graphics system 102 can also create a skin region soft mask for the second character in the style exemplar image based on the generated skin region trimap for the second character. In some embodiments, the computer graphics system 102 can determine a pixelwise difference between the generated head soft mask and skin region soft mask of the first character and segment or separate the first character into a hair region soft mask and the skin region soft mask based on the pixelwise difference. The computer graphics system 102 can also use a pixelwise difference between the generated head soft mask and skin region soft mask of the second character to segment the second character into a hair region soft mask and the skin region soft mask of the second character. In this example, a pixelwise difference corresponds to a difference between pixels in the head soft mask and pixels in the skin region soft mask.

In block 1406, a positional guide is generated for the target image and the style exemplar image. In some embodiments, the computer graphics application 140 causes the computer graphics system 102 to generate the positional guide using various methods or techniques.

For example, the computer graphics system 102 can generate the positional guide by identifying a correspondence between a position of a target feature of the various features of the target image identified in block 1404 and a position of a particular corresponding style feature of the features of the style exemplar image identified in block 1404. In some embodiments, the computer graphics system 102 generates the positional guide by warping the position of the particular style feature to the position of the corresponding target feature (e.g., using moving least squares deformation). In some examples, warping the position of the particular style feature can include rotating the style exemplar image by estimating the closest relative rotation that aligns corresponding regions or features of the style exemplar image and the target image to have a minimal distance in the least squares sense using a closed-form solution. In some embodiments, the positional guide for the style exemplar and the target image can be used to encourage patches of the style exemplar image to be transferred to similar relative positions in the target image. For example, the computer graphics system 102 can use the positional guide and/or the segmentation guide generated in block 1402 to apply a texture or style of the style exemplar image to the target image. For instance, the computer graphics system 102 can use the positional guide and/or the segmentation guide to transfer or apply a texture at the position of the style feature to the position of the corresponding target feature.

In block 1408, an appearance guide is generated for the target image and the style exemplar image. In some embodiments, the computer graphics application 140 causes the computer graphics system 102 to generate the appearance guide using various methods or techniques.

For example, the computer graphics system 102 can generate the appearance guide by converting the style exemplar image and the target image into grayscale. For example, the computer graphics system 102 can generate a converted target image and a converted style exemplar image by converting a copy of the target image and a copy of the target image into grayscale. The computer graphics system 102 can then determine or identify a global intensity level of the converted target image and a global intensity level of the converted style exemplar image. The computer graphics system 102 can modify the global intensity level of the converted target image to match the global intensity level of the converted style exemplar image. The computer graphics system 102 can determine or identify a local and global contrast of the converted target image and a local and global contrast of the converted style exemplar image. The computer graphics system 102 can then match the local and global contrast of the converted target image to the local and global contrast of the converted style exemplar image. The computer graphics system 102 can identify a set of pixels in the converted style exemplar image having an intensity level that matches an intensity level of a set of pixels in the converted target image. The computer graphics system 102 can then transfer a style or texture of the style exemplar image (e.g., the unconverted style exemplar image) to the target image (e.g., the unconverted target image) using the identified set of pixels in the converted style exemplar image, which can preserve an identity of a subject in the target image while retaining a textural richness of the style exemplar image.

In block 1410, a stylized image is generated or created by applying a style or texture of the particular style feature to the particular target feature using the segmentation guide, the positional guide, or the appearance guide. In some examples, the computer graphics application 140 causes the computer graphics system 102 to generate the stylized image. In some embodiments, the computer graphics system creates the stylized image using the segmentation guide, positional guide, and/or the appearance guide in substantially the same manner as described above with respect to block 212 of FIG. 2.

In block 1412, the stylized image is output. In some embodiments, the computer graphics application 140 causes the computer graphics system 102 to generate one or more user interfaces for outputting or displaying the stylized image.

In some embodiments, one or more of the operations described above with respect to FIG. 14 can be used to generate a stylized video or animation. For instance, the computer graphics application 140 causes the computer graphics system 102 to generate a stylized video or a stream of stylized images. In this example, the computer graphics application 140 causes the computer graphics system 102 to generate a temporal guide for generating the stylized video or stylized animation. The computer graphic system 102 can use the temporal guide to control an amount of temporal flickering in the stylized video or stream of stylized images. In some examples, the computer graphics system 102 can generate the temporal guide by advecting a stylized image of the stream of stylized images using an underlying motion field. The computer graphics system 102 can then generate the temporal guide by blurring the advected stylized image and a style exemplar image used to create one or more of the stream of stylized images. In this example, the computer graphics system 102 can use the generated temporal guide to generate a stylized video that preserves an appearance of a sequence of images having a particular artistic style or texture that can exhibit a certain amount of temporal flickering. In some embodiments, the computer graphics system 102 uses the temporal guide to control the amount of temporal flickering in the sequence of stylized images by varying the amount of blur of the advected stylized image and/or the style exemplar image.

System Implementation Example

Any suitable computing system or group of computing systems can be used for performing the operations described herein. FIG. 13 is an example of a block diagram of a computing device that executes a computer graphics system 102 to perform the operations described herein.

The depicted example of the computing device 104 includes one or more processors 1302 communicatively coupled to one or more memory devices 1304. The processor 1302 executes computer-executable program code stored in the memory device 1304, accesses information stored in the memory device 1304, or both. Examples of the processor 1302 include a microprocessor, an application-specific integrated circuit ("ASIC"), a field-programmable gate array ("FPGA"), or any other suitable processing device. The processor 1302 can include any number of processing devices, including one or more processors 1302 that are configured by program code to implement the operations described above, such as the operations depicted in FIGS. 2 and 14 that are described with respect to processing devices.

The memory device 1304 includes any suitable non-transitory computer-readable medium for storing the computer graphics system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 1304 are used to implement the operations described above, such as the operations depicted in FIGS. 1-2 that are described with respect to one or more non-transitory computer-readable media.

The computing device 104 may also include a number of external or internal devices such as input or output devices. For example, the computing device 104 is shown with an input/output ("I/O") interface 1308 that can receive input from input devices or provide output to output devices. A bus 1306 can also be included in the computing device 104. The bus 1306 can communicatively couple one or more components of the computing device 104. In some embodiments, the bus 1306 is used to implement the operations described above with respect to FIGS. 1-2 that involve communicating signals via a data bus.

The computing device 104 executes program code that configures the processor 1302 to perform one or more of the operations described above with respect to FIG. 1-2. The program code includes, for example, computer graphics application 140 or other suitable applications that perform one or more operations described herein. The program code may be resident in the memory device 1304 or any suitable computer-readable medium and may be executed by the processor 1302 or any other suitable processor. In some embodiments, the program code described above is stored in the memory device 1304, as depicted in FIG. 13. In additional or alternative embodiments, the program code described above is stored in one or more memory devices accessible via a data network.

The computing device 104 accesses the style exemplar data 114 or the target data 116 in any suitable manner. In some embodiments, the style exemplar data 114 or the target data 116 is stored in one or more memory devices accessible via a data network 108. In additional or alternative embodiments, some or all of the style exemplar data 114 or the target data 116 is stored in the memory device 1304.

The computing device 104 depicted in FIG. 13 also includes at least one network interface 1310. The network interface 1310 includes any device or group of devices suitable for establishing a wired or wireless data connection to one or more data networks 108. Non-limiting examples of the network interface 1310 include an Ethernet network adapter, a modem, and/or the like. The computing device 104 is able to communicate with one or more web servers 1312 via which a user may access the computer graphics system 102 or computer graphics application 140. In some embodiments, the network interface 1310 is used to implement the operations described above with respect to FIGS. 1-2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method for generating a stylized image, the method comprising:

obtaining, by a processor, data indicating a target image and a style exemplar image, the target image including a first character and the style exemplar image including a second character and wherein the style exemplar image includes a style or texture;

generating, by the processor, a segmentation guide for the target image and the style exemplar image by:
creating a first head soft mask of the first character and a second head soft mask of the second character;
identifying a plurality of target features of the target image and a plurality of style features of the style exemplar image; and
creating a soft mask for a target feature of the plurality of target features and a soft mask for a style feature of the plurality of style features;

creating, by the processor and using the segmentation guide, the stylized image by applying the texture or style from the style exemplar image to the target image; and outputting, by the processor, the stylized image for display via a user interface or for storage.

2. The method of claim 1, wherein the first character is the same as the second character.

3. The method of claim 1, further comprising:
generating, by the processor, a positional guide for the target image and the style exemplar image by:
identifying a correspondence between a first position of the target feature or another target feature of the plurality of target features and a second position of the style feature or another style feature of the plurality of style features relative to a common grid; and
warping the second position of the style feature to the first position of the target feature, and wherein creating the stylized image further comprises:
applying, by the processor and using the segmentation guide and the positional guide, a first texture or style of the style exemplar image at the second position of the style feature to the target image at the first position of the target feature.

4. The method of claim 3, further comprising:
generating, by the processor, an appearance guide for the style exemplar image and the target image by:
generating a converted target image and a converted style exemplar image by converting a copy of the style exemplar image and a copy of the target image into grayscale;

matching a global intensity level of the converted target image to a global intensity level of the converted style exemplar image;

matching a local and global contrast of the converted target image to a local and global contrast of the converted style exemplar image;

identifying a set of pixels in the converted target image having an intensity level that matches an intensity level of a set of pixels in the converted style exemplar image; and transferring the style or texture of the style exemplar image to the target image using the identified set of pixels in the converted style exemplar image.

5. The method of claim 1, further comprising:

generating, by the processor, an appearance guide for the style exemplar image and the target image by:

generating a converted target image and a converted style exemplar image by converting a copy of the style exemplar image and a copy of the target image into grayscale;

matching a global intensity level of the converted target image to a global intensity level of the converted style exemplar image;

matching a local and global contrast of the converted target image to a local and global contrast of the converted style exemplar image;

identifying a set of pixels in the converted target image having an intensity level that matches an intensity level of a set of pixels in the converted style exemplar image; and transferring the style or texture of the style exemplar image to the target image using the identified set of pixels in the converted style exemplar image.

6. The method of claim 1, further comprising:

generating, by the processor, a temporal guide for generating a stylized video, the stylized video comprising a plurality of stylized images and the temporal guide usable for determining an amount of temporal flickering in the stylized video, wherein generating the temporal guide comprises advecting, by the processor and using an underlying motion field, a stylized image of the plurality of stylized images;

controlling, by the processor, the amount of temporal flickering in the stylized video by varying an amount of blur of the advected stylized image and the style exemplar image; and outputting, by the processor, the stylized video for display via the user interface or for storage.

7. The method of claim 1, wherein generating the segmentation guide further comprises creating a first hair region soft mask of the first character and a second hair region soft mask of the second character, wherein creating the first head soft mask of the first character and the second head soft mask of the second character comprises:

removing, by the processor, a foreground mask from the target image to create a trimap of the first character and a foreground mask from the style exemplar image to create a trimap of the second character;

identifying, by the processor, a landmark target feature of the first character and refining the trimap of the first character using the landmark target feature;

identifying, by the processor, a landmark style feature of the second character and refining the trimap of the second character using the landmark style feature; and generating, by the processor and using a matting algorithm, the first head soft mask based on the refined trimap of the first character and the second head soft mask based on the refined trimap of the second character.

8. The method of claim 1, wherein generating the segmentation guide further comprises creating a first hair region soft mask of the first character and a second hair region soft mask of the second character, wherein creating the first hair region soft mask of the first character and the second hair region soft mask of the second character comprises:

generating, by the processor, a first skin region trimap of the first character and a second skin region trimap of the second character by:

converting the target image and the style exemplar image to $YC_BC_R$ color space; and determining a likelihood of each pixel in the target image and each pixel in the style exemplar image being a skin pixel by using a color classification algorithm, wherein determining the likelihood of a pixel being a skin pixel comprises comparing the pixel to a threshold value;

creating a first skin region soft mask based on the first skin region trimap and a second skin region soft mask based on the second skin region trimap;

segmenting the first character into the first hair region soft mask and the first skin region soft mask based on a first pixelwise difference between the first head soft mask and the first skin region soft mask, wherein a pixelwise difference corresponds to a difference between pixels in the first head soft mask and pixels in the first skin region soft mask; and segmenting the second character into the second hair region soft mask and the second skin region soft mask based on a second pixelwise difference between the second head soft mask and the second skin region soft mask.

9. A method for generating a stylized image, the method comprising:

obtaining, by a processor, data indicating a target image and a style exemplar image, the target image including a first character and the style exemplar image including a second character and wherein the style exemplar image includes a style or texture;

generating, by the processor, an appearance guide for the style exemplar image and the target image by:

generating a converted target image and a converted style exemplar image by converting a copy of the style exemplar image and a copy of the target image into grayscale;

matching a global intensity level of the converted target image to a global intensity level of the converted style exemplar image;

matching a local and global contrast of the converted target image to a local and global contrast of the converted style exemplar image;

identifying a set of pixels in the converted target image having an intensity level that matches an intensity level of a set of pixels in the converted style exemplar image; and transferring the style or texture of the style exemplar image to the target image using the identified set of pixels in the converted style exemplar image;

creating, by the processor and using the appearance guide, the stylized image by applying the texture or style from the style exemplar image to the target image; and outputting, by the processor, the stylized image for display via a user interface or for storage.

10. The method of claim 9, further comprising:
generating, by the processor, a segmentation guide for the target image and the style exemplar image by:
creating a first head soft mask of the first character and a second head soft mask of the second character;
identifying a plurality of target features of the target image and a plurality of style features of the style exemplar image; and
creating a soft mask for a target feature of the plurality of target features and a soft mask for a style feature of the plurality of style features.

11. The method of claim 9, further comprising:
generating, by the processor, a positional guide for the target image and the style exemplar image by:
identifying a plurality of target features of the target image and a plurality of style features of the style exemplar image;
determining a correspondence between a first position of a target feature of the plurality of target features and a second position of a style feature of the plurality of style features relative to a common grid; and
warping the second position of the style feature to the first position of the target feature, and wherein creating the stylized image further comprises:
applying, by the processor and using the positional guide, a first texture or style of the style exemplar image at the second position of the style feature to the target image at the first position of the target feature.

12. The method of claim 9, further comprising:
generating, by the processor, a temporal guide for generating a stylized video, the stylized video comprising a plurality of stylized images and the temporal guide usable for determining an amount of temporal flickering in the stylized video, wherein generating the temporal guide comprises advecting, by the processor and using an underlying motion field, a stylized image of the plurality of stylized images;
controlling, by the processor, the amount of temporal flickering in the stylized video by varying an amount of blur of the advected stylized image and the style exemplar image; and
outputting, by the processor, the stylized video for display via the user interface or for storage.

13. A method comprising:
obtaining, by a processor, data indicating a target image and a style exemplar image, the target image including a first character and the style exemplar image including a second character and wherein the style exemplar image includes a style or texture;
generating, by the processor, a temporal guide for generating a stylized video, the stylized video comprising a plurality of stylized images and the temporal guide usable for determining an amount of temporal flickering in the stylized video, wherein generating the temporal guide comprises advecting, by the processor and using an underlying motion field, a stylized image of the plurality of stylized images;
controlling, by the processor, the amount of temporal flickering in the stylized video by varying an amount of blur of the advected stylized image and the style exemplar image; and
outputting, by the processor, the stylized video for display via a user interface or for storage.

14. The method of claim 13, further comprising:
generating, by the processor, a segmentation guide for the target image and the style exemplar image by:
creating a first head soft mask of the first character and a second head soft mask of the second character;
identifying a plurality of target features of the target image and a plurality of style features of the style exemplar image; and
creating a soft mask for a target feature of the plurality of target features and a soft mask for a style feature of the plurality of style features;
creating, by the processor, a stylized image by applying the texture or style from the style exemplar image to the target image; and
outputting, by the processor, the stylized image for display via the user interface or for storage.

15. The method of claim 13, further comprising:
generating, by the processor, a positional guide for the target image and the style exemplar image by:
identifying a plurality of target features of the target image and a plurality of style features of the style exemplar image;
determining a correspondence between a first position of a target feature of the plurality of target features and a second position of a style feature of the plurality of style features relative to a common grid; and
warping the second position of the style feature to the first position of the target feature, and wherein creating the stylized image further comprises:
applying, by the processor and using the positional guide, a first texture or style of the style exemplar image at the second position of the style feature to the target image at the first position of the target feature.

16. The method of claim 13, further comprising:
generating, by the processor, an appearance guide for the style exemplar image and the target image by:
generating a converted target image and a converted style exemplar image by converting a copy of the style exemplar image and a copy of the target image into grayscale;
matching a global intensity level of the converted target image to a global intensity level of the converted style exemplar image;
matching a local and global contrast of the converted target image to a local and global contrast of the converted style exemplar image;
identifying a set of pixels in the converted target image having an intensity level that matches an intensity level of a set of pixels in the converted style exemplar image; and
transferring the style or texture of the style exemplar image to the target image using the identified set of pixels in the converted style exemplar image.

17. A system comprising:
one or more processing devices; and
one or more non-transitory computer-readable media communicatively coupled to the one or more processing devices and storing program code,
wherein the one or more processing devices is configured for executing the program code and thereby performing operations comprising:
obtaining data indicating a target image and a style exemplar image; and performing one or more of (1)

a first set of stylization operations, (2) a second set of stylization operations, and (3) a third set of stylization operations,
wherein the first set of stylization operations comprises:
(a) generating a segmentation guide for the target image and the style exemplar image by at least:
  (i) creating a first head soft mask of a first character depicted in the target image and a second head soft mask of a second character depicted in the style exemplar image,
  (ii) identifying a target feature of the target image and a style feature of the style exemplar image, and
  (iii) creating a soft mask for the target feature and a soft mask for the style feature, and
(b) creating a stylized image by using the segmentation guide to apply a texture or style from the style exemplar image to the target image;
wherein the second set of stylization operations comprises:
(a) generating an appearance guide for the style exemplar image and the target image by at least:
  (i) generating a converted target image and a converted style exemplar image by converting a copy of the style exemplar image and a copy of the target image into grayscale,
  (ii) matching a global intensity level of the converted target image to a global intensity level of the converted style exemplar image,
  (iii) matching a local and global contrast of the converted target image to a local and global contrast of the converted style exemplar image,
  (iv) identifying a set of pixels in the converted target image having an intensity level that matches an intensity level of a set of pixels in the converted style exemplar image, and
  (v) transferring the style or texture of the style exemplar image to the target image using the identified set of pixels in the converted style exemplar image, and
(b) creating the stylized image or a different stylized image by using the appearance guide to apply the texture or style from the style exemplar image to the target image; and
wherein the third set of stylization operations comprises:
(a) generating a temporal guide usable for determining an amount of temporal flickering in a stylized video, wherein generating the temporal guide comprises advecting a particular stylized image from a plurality of stylized images that are included in the stylized video,
(b) controlling the amount of temporal flickering in the stylized video by varying an amount of blur of the advected stylized image and the style exemplar image, and
(c) outputting the stylized video for display via a user interface or for storage.

18. The system of claim 17, wherein the first character is the same as the second character.

19. The system of claim 17, wherein generating the segmentation guide further comprises creating a first hair region soft mask of the first character and a second hair region soft mask of the second character, wherein creating the first head soft mask of the first character and the second head soft mask of the second character comprises:
removing, by the processor, a foreground mask from the target image to create a trimap of the first character and a foreground mask from the style exemplar image to create a trimap of the second character;
identifying, by the processor, a landmark target feature of the first character and refining the trimap of the first character using the landmark target feature;
identifying, by the processor, a landmark style feature of the second character and refining the trimap of the second character using the landmark style feature; and
generating, by the processor and using a matting algorithm, the first head soft mask based on the refined trimap of the first character and the second head soft mask based on the refined trimap of the second character.

20. The system of claim 17, wherein generating the segmentation guide further comprises creating a first hair region soft mask of the first character and a second hair region soft mask of the second character, wherein creating the first hair region soft mask of the first character and the second hair region soft mask of the second character comprises:
generating, by the processor, a first skin region trimap of the first character and a second skin region trimap of the second character by:
  converting the target image and the style exemplar image to $YC_BC_R$ color space; and
  determining a likelihood of each pixel in the target image and each pixel in the style exemplar image being a skin pixel by using a color classification algorithm, wherein determining the likelihood of a pixel being a skin pixel comprises comparing the pixel to a threshold value;
creating a first skin region soft mask based on the first skin region trimap and a second skin region soft mask based on the second skin region trimap;
segmenting the first character into the first hair region soft mask and the first skin region soft mask based on a first pixelwise difference between the first head soft mask and the first skin region soft mask, wherein a pixelwise difference corresponds to a difference between pixels in the first head soft mask and pixels in the first skin region soft mask; and segmenting the second character into the second hair region soft mask and the second skin region soft mask based on a second pixelwise difference between the second head soft mask and the second skin region soft mask.

* * * * *